US012648836B2

(12) United States Patent
Pelote et al.

(10) Patent No.: US 12,648,836 B2
(45) Date of Patent: Jun. 9, 2026

(54) DENTAL ATTACHMENT ASSEMBLIES, ANGLED IMPLANT ASSEMBLIES, AND METHODS OF USE

(71) Applicant: ZEST IP HOLDINGS, LLC, Carlsbad, CA (US)

(72) Inventors: Steven Pelote, Carlsbad, CA (US); Michael Schulzki, Carlsbad, CA (US); Tom Stratton, Carlsbad, CA (US); Maxwell Mckinnon, Carlsbad, CA (US); Eller Torres, Carlsbad, CA (US)

(73) Assignee: ZEST IP HOLDINGS, LLC, Carlsbad, CA (US)

( * ) Notice: Subject to any disclaimer, the term of this patent is extended or adjusted under 35 U.S.C. 154(b) by 0 days.

(21) Appl. No.: 18/106,976

(22) Filed: Feb. 7, 2023

(65) Prior Publication Data

US 2023/0172695 A1    Jun. 8, 2023

Related U.S. Application Data

(63) Continuation of application No. 17/926,478, filed as application No. PCT/US2022/039293 on Aug. 3, (Continued)

(51) Int. Cl.
*A61C 8/00*        (2006.01)
*A61C 13/265*        (2006.01)

(52) U.S. Cl.
CPC .......... *A61C 8/0068* (2013.01); *A61C 8/0062* (2013.01); *A61C 8/0095* (2013.01); *A61C 13/2656* (2013.01)

(58) Field of Classification Search
CPC ..... A61C 8/0068; A61C 8/005; A61C 8/0048; A61C 13/2656; A61C 13/265; A61C 13/225
(Continued)

(56) References Cited

U.S. PATENT DOCUMENTS

| | | | |
|---|---|---|---|
| 4,540,367 A | 9/1985 | Sulc | |
| 5,417,570 A | 5/1995 | Zuest et al. | |

(Continued)

FOREIGN PATENT DOCUMENTS

| | | |
|---|---|---|
| CN | 206603828 U | 11/2017 |
| EP | 2491886 B1 | 5/2014 |

(Continued)

OTHER PUBLICATIONS

Crealock Solutions; Tissue Friendly, Full Digital Workflow, Hygienic, Customized; Crealock Solutions; Createch Medical, downloaded on Nov. 11, 2022, https://www.createchmedical.com/en/solutions/crealock-solutions/, 2 pages.

(Continued)

*Primary Examiner* — Eric J Rosen
*Assistant Examiner* — Mirayda A Aponte
(74) *Attorney, Agent, or Firm* — Procopio, Cory, Hargreaves & Savitch LLP

(57) ABSTRACT

Dental attachment assemblies for a mouth of a patient are provided. Contemplated dental attachment assemblies may include an abutment member, and a retention member for attachment to the abutment member. The retention member may comprise an upper end and a continuous, unbroken skirt projecting from the upper end for fixed, non-patient removable, fixed engagement over an outer locating surface of the abutment member. The retention member can be constructed from a rigid material, such as PEEK, such that it provides a retentive force of about 10 to 75 pounds. The abutment member may be configured for attachment to an implant
(Continued)

having an upper portion including a threaded portion configured to screw into a threaded recess of an abutment, and a lower portion including an angled platform and a threaded post extending from the platform.

14 Claims, 19 Drawing Sheets

Related U.S. Application Data 2022, which is a continuation-in-part of application No. 17/703,512, filed on Mar. 24, 2022, which is a continuation-in-part of application No. 17/499,683, filed on Oct. 12, 2021, which is a continuation-in-part of application No. 17/478,320, filed on Sep. 17, 2021, now Pat. No. 11,779,438, which is a continuation-in-part of application No. 17/394,275, filed on Aug. 4, 2021, said application No. PCT/US2022/039293 is a continuation-in-part of application No. 17/499,665, filed on Oct. 12, 2021, now Pat. No. 11,596,504, which is a continuation-in-part of application No. 17/478,320, filed on Sep. 17, 2021, now Pat. No. 11,779,438, which is a continuation-in-part of application No. 17/394,275, filed on Aug. 4, 2021, said application No. PCT/US2022/039293 is a continuation-in-part of application No. 17/499,671, filed on Oct. 12, 2021, now Pat. No. 12,414,843, which is a continuation-in-part of application No. 17/478,320, filed on Sep. 17, 2021, now Pat. No. 11,779,438, which is a continuation-in-part of application No. 17/394,275, filed on Aug. 4, 2021.

(58) Field of Classification Search

USPC ....................................... 433/172–176, 201.1

See application file for complete search history.

(56) References Cited

U.S. PATENT DOCUMENTS

| | | | |
|---|---|---|---|
| 6,030,219 A | 2/2000 | Zuest et al. | |
| 6,299,447 B1 | 10/2001 | Zuest et al. | |
| 6,981,871 B2 | 1/2006 | Mullaly et al. | |
| 7,704,076 B2 | 4/2010 | Mullaly et al. | |
| 8,192,199 B2 | 6/2012 | Arni | |
| 9,161,825 B2 | 10/2015 | Nardi | |
| 9,301,818 B2 * | 4/2016 | Benz .................... | A61C 8/0089 |
| 9,314,318 B2 | 4/2016 | Mullaly et al. | |
| 9,452,029 B2 | 9/2016 | Mullaly et al. | |
| 9,456,881 B1 | 10/2016 | Niznick | |
| 9,517,114 B2 | 12/2016 | Mullaly | |
| 9,931,181 B2 | 4/2018 | Allen et al. | |
| 10,687,920 B2 | 6/2020 | Allen et al. | |
| 11,730,571 B2 | 8/2023 | Storni | |
| 11,779,438 B2 | 10/2023 | Stratton et al. | |
| 11,813,140 B2 | 11/2023 | Allen | |
| 2009/0246733 A1 | 10/2009 | Auderset et al. | |
| 2010/0055644 A1 * | 3/2010 | Arni ..................... | A61C 8/0074 |
| | | | 433/174 |
| 2010/0055645 A1 * | 3/2010 | Mullaly ............... | A61C 8/0075 |
| | | | 433/215 |
| 2014/0162212 A1 * | 6/2014 | Mullaly ............... | A61C 8/0053 |
| | | | 433/173 |
| 2015/0335401 A1 | 11/2015 | Robichaud et al. | |
| 2017/0281320 A1 | 10/2017 | Blackbeard et al. | |
| 2018/0177571 A1 | 6/2018 | Allen et al. | |
| 2020/0197134 A1 | 6/2020 | Llop | |
| 2021/0038348 A1 | 2/2021 | Allen et al. | |
| 2021/0386526 A1 | 12/2021 | Storni | |
| 2023/0044939 A1 | 2/2023 | Stratton et al. | |
| 2025/0177097 A1 | 6/2025 | Storni | |

FOREIGN PATENT DOCUMENTS

| | | |
|---|---|---|
| EP | 3407826 A1 | 12/2018 |
| WO | 2015188148 A1 | 12/2015 |
| WO | 2017131833 A1 | 8/2017 |
| WO | 2018039066 A1 | 3/2018 |
| WO | 2018154610 A1 | 8/2018 |
| WO | 2020152101 A1 | 7/2020 |

OTHER PUBLICATIONS https://shop.straumann.com/us/en_us/Prosthetic-Solutions/TL-%28Tissue-Level%29/for-Narrow-Neck-CrossFit%C2%AE-%28NNC%29-Implants/Prosthetics-for-Edentulous-NNC/Novaloc-Components-NNC/Novaloc%C2%AE-Retention-Inserts%2C-4pcs/p/2010.712-NOV/.

International Search Report and Written Opinion for related PCT/US2022/039293 dated Nov. 23, 2022.

Final Office Action for U.S. Appl. No. 17/499,671, dated Jul. 3, 2023, 17 pgs.

Final Office Action for U.S. Appl. No. 17/499,683, dated Jul. 18, 2023, 16 pgs.

International Preliminary Report on Patentability for PCT App No. PCT/US2022/039293 dated Feb. 15, 2024, 7 pgs.

Non Final Office Action for U.S. Appl. No. 17/499,683, dated Dec. 19, 2023, 19 pgs.

Non-Final Office Action for U.S. Appl. No. 17/394,275, dated Feb. 1, 2024, 28 pgs.

Non-Final Office Action for U.S. Appl. No. 17/478,320, dated Mar. 15, 2023, 6 pgs.

Non-Final Office Action for U.S. Appl. No. 17/499,671 dated Mar. 15, 2023, 6 pgs.

Non-Final Office Action for U.S. Appl. No. 17/499,671, dated Feb. 15, 2024, 19 pgs.

Non-Final Office Action for U.S. Appl. No. 17/499,683, dated Mar. 28, 2023, 6 pgs.

Notice of Allowance for U.S. Appl. No. 17/478,320, dated Jun. 27, 2023, 8 pgs.

Final Office Action for U.S. Appl. No. 17/499,671 dated Jul. 3, 2023.

Examiner-Initiated Interview Summary for U.S. Appl. No. 17/499,671 dated Jul. 3, 2023.

Non Final Office Action for U.S. Appl. No. 18/240,979, dated Mar. 26, 2024, 18 pgs.

Non Final Office Action for U.S. Appl. No. 18/241,027, dated Mar. 26, 2024, 19 pgs.

Final Office Action for U.S. Appl. No. 17/394,275, dated Sep. 24, 2024, 24 pgs.

Final Office Action for U.S. Appl. No. 18/240,979, dated Oct. 24, 2024, 15 pgs.

Final Office Action for U.S. Appl. No. 18/241,027, dated Jul. 30, 2024, 19 pgs.

Final Office Action for U.S. Appl. No. 17/499,671, dated Aug. 27, 2024, 18 pgs.

Final Office Action for U.S. Appl. No. 17/499,683, dated May 6, 2024, 19 pgs.

Non Final Office Action for U.S. Appl. No. 17/703,512, dated May 30, 2024, 15 pgs.

Non Final Office Action for U.S. Appl. No. 17/499,683, dated Feb. 5, 2025, 18 pgs.

Final Office Action for U.S. Appl. No. 17/703,512, dated Feb. 13, 2025, 17 pgs.

Non Final Office Action for U.S. Appl. No. 17/499,671, dated Mar. 20, 2025, 9 pgs.

Non Final Office Action for U.S. Appl. No. 17/926,478, dated Mar. 27, 2025, 14 pgs.

Office Action for EP App No. 22853859.1 dated May 9, 2025, 12 pgs.

Notice of Allowance for U.S. Appl. No. 17/499,671, mailed Aug. 18, 2025, 9 pgs.

Extended European Search Report for EP App No. 22853859.1, dated Aug. 28, 2025, 15 pgs.

(56)         References Cited

OTHER PUBLICATIONS

Final Office Action for U.S. Appl. No. 18/241,027, mailed Sep. 11, 2025, 18 pgs.
Non Final Office Action for U.S. Appl. No. 17/703,512, mailed Oct. 8, 2025, 18 pgs.
Rhein 83, American Recovery—Rhein83USA Dental Attachments, Easy Fix, [online] retrieved Jul. 23, 2025, https://www.rhein83usa.com/easy-fix.
Rhein 83, American Recovery—Rhein83USA Dental Attachments, Brochure, [online] retrieved Jul. 23, 2025, Brochure_Easy_FIX_MOD_D410_REV01_DEL_19-06-2025_ENG_A4_PER_WEB_low.pdf.
www.rhein83.it, OT Equator Prosthetic Catalog, [online] retrieved Jul. 23, 2025, rhein83usa.com/_files/ugd/d0904f_794a67f005184b25af.
Non Final Office Action for U.S. Appl. No. 18/240,979, dated May 28, 2025, 17 pgs.
Non Final Office Action for U.S. Appl. No. 17/394,275, dated Jun. 2, 2025, 27 pgs.
U.S. Department of Health and Human Services, Food and Drug Administration, Center for Devices and Radiological Health, Guidance on Medical Device Patient Labeling; Final Guidance for Industry and FDA Reviewers, Apr. 19, 2001, 54 pgs. [online] https://www.fda.gov/media/71030/download.
Office Action dated Nov. 28, 2025 in U.S. Appl. No. 17/499,683.
Notice of Allowance dated Jan. 30, 2026 in U.S. Appl. No. 17/926,478.
Notice of Allowance dated Feb. 2, 2026 in U.S. Appl. No. 18/241,027.
Notice of Allowance dated Feb. 4, 2026 in U.S. Appl. No. 18/240,979.
Notice of Allowance dated Feb. 4, 2026 in U.S. Appl. No. 17/934,275.
Notice of Allowance dated Apr. 1, 2026 in U.S. Appl. No. 17/703,512.
Notice of Allowance dated Apr. 15, 2026 in U.S. Appl. No. 17/499,683.

* cited by examiner

| Retention Insert Color | Retention |
|---|---|
| ⬤ Red, ExtraLight | Approx. 300g |
| ○ White, Light | Approx. 750g |
| ◉ Yellow, Medium | Approx. 1200g |
| ⬤ Green, Strong | Approx. 1650g |
| ⬤ Blue, Extra-strong | Approx. 2100g |
| ⬤ Black, Ultra-Strong | Approx. 2550g |

1804
1803
1802
1805

1804
1803
1802
1805

1803
1802
1805

DENTAL ATTACHMENT ASSEMBLIES, ANGLED IMPLANT ASSEMBLIES, AND METHODS OF USE

CROSS-REFERENCE TO RELATED APPLICATIONS

This application is a continuation of U.S. patent application Ser. No. 17/926,478, filed Nov. 18, 2022, which is a 371 of U.S. International Application No. PCT/US22/39293, filed on Aug. 3, 2022, which is a continuation-in-part of U.S. patent application Ser. No. 17/703,512, filed Mar. 24, 2022, which is a continuation-in-part of U.S. patent application Ser. No. 17/499,683, filed Oct. 12, 2021, which is a continuation-in-part of U.S. patent application Ser. No. 17/478, 320, filed on Sep. 17, 2021, which is a continuation-in-part of U.S. patent application Ser. No. 17/394,275, filed on Aug. 4, 2021. U.S. International Application No. PCT/US22/ 39293, filed on Aug. 3, 2022, is also a continuation-in-part of U.S. patent application Ser. No. 17/499,665, filed on Oct. 12, 2021, which is a continuation-in-part of U.S. patent application Ser. No. 17/478,320, filed on Sep. 17, 2021, which is a continuation-in-part of U.S. patent application Ser. No. 17/394,275, filed on Aug. 4, 2021. U.S. International Application No. PCT/US22/39293, filed on Aug. 3, 2022, is also a continuation-in-part of U.S. patent application Ser. No. 17/499,671, filed on Oct. 12, 2021, which is a continuation-in-part of U.S. patent application Ser. No. 17/478,320, filed on Sep. 17, 2021, which is a continuation-in-part of U.S. patent application Ser. No. 17/394,275, filed on Aug. 4, 2021. All references, including publications, patent applications, and patents, cited herein are hereby incorporated by reference to the same extent as if each reference were individually and specifically indicated to be incorporated by reference and were set forth in its entirety herein.

TECHNICAL FIELD

Background

Standard dentures are fully removable dentures that are placed in the mouth after all teeth have been removed. Once the mouth tissue has healed, the dentures are placed. These dentures are held in place by suction contact or denture adhesive. For a standard denture to be placed, any remaining teeth must be extracted and the patient will be fitted for the device. Without the extracted teeth's previous support, the gum ridge will begin to collapse and the mouth will develop a sunken look. Since the gum ridge flattens over time and the tongue tends to knock standard dentures loose, such a device can become a nuisance at best or even a serious inhibitor to such basic functions as eating and speaking. These and similar minor disturbances in the oral cavity can constitute a major disruption to one's quality of living.

There are generally two types of alternative dentures, fixed or removable dentures, often referred to as overdentures. Overdentures form a gum-supported base onto which a removable denture can be placed; overdenture implants are typically performed on the bottom teeth. Implants are placed into the jawbone to serve as anchors for the overdenture itself. Often the overdenture is made for the bottom teeth, since traditional dentures remain less stable on the lower palate than the upper due to the lower ridge's u-shape, lack of osmotic pressure, tongue movement, and other factors. After the implants are placed, the restoring dentist may use LOCATOR® attachment systems to attach the removable prosthetic denture to the implants. The LOCATOR attachments ensure that the denture will not dislodge unintentionally and will not inconvenience the patient by preventing sliding or shifting in the mouth. Overdentures are designed to be removable by the patient for daily hygiene maintenance.

The advantages of overdentures are manifold. Often people choose implant overdentures over conventional dentures because implants offer a conservative way to add retention, stability, and comfort to the edentulous patient. Instead of sliding freely around the gum area, the denture remains snugly in place in the mouth because it is anchored to the implants. One way this benefits the patient is by allowing her to maintain her dietary health. While someone with traditional dentures must stay away from chewy or hard foods for fear of dislodging the denture, someone with an implant-secured overdenture can maintain his ability to adhere to his regular diet, fully chew his food, and absorb vital nutrition.

Furthermore, the implants themselves help stop facial-contour deterioration, improving not only the physical but also the mental well-being of implant overdenture wearers. Ordinary dentures cause facial bone loss, perpetuating jaw collapse and premature aging. Such facial bone collapse occurs because after one's teeth are removed and one begins to wear a denture, the denture speeds up bone loss by deteriorating the bone ridges where the denture is placed. Moreover, the jaw area increasingly resorbs in the areas where the teeth have been extracted due to lack of stimulation. Overdenture implants provide support for the jaw and gum area, since the implants will naturally integrate with live gum and bone, fortifying the jaw line and preventing bone resorption and facial bone loss. Such osseointegration not only keeps the facial bones physiologically healthy, but it also improves the psychological health of wearers by allowing them to speak, eat, smile, and maintain their natural appearance with increased confidence.

Overall, implant overdentures present a more comfortable, healthy, and durable option than standard dentures. The implants keep the denture secured in place, allowing the patient to converse with confidence, participate in normal social interactions, and even enjoy a diverse diet for optimal nutritional health. Moreover, the implants keep the facial contours and jaw line from collapsing, allowing edentulous patients to maintain bone retention and actually strengthen the jaw line.

But overdentures are not without drawbacks. Dental anchoring or attachment assemblies are utilized to anchor the overdenture appliance with a dental implant or tooth root, typically by fitting two or more partially-movable components together to provide an improved fit and comfort. In some assemblies, male and female parts have mating, snap engageable formations for releasably securing the male part to the female part. For example, the female part, which is anchored to the dental implant or tooth root, has a socket and the male part, which resides in the appliance or prosthesis has a head for snap engagement in the socket. But repeated impacts of the socket and head, as the prosthesis is removed and reattached, can damage the retentive head of the male and cause wearing due to friction of the components as they move. A compressible annular ring can be provided to absorb the frictional forces and act as a cushion between the socket and the head; however, even the ring may wear out over a period of time and need to be replaced, requiring regular maintenance of the dental anchoring assembly that is uncomfortable and inconvenient for the patient. Furthermore, to allow the compressible annular ring to be easily removed and replaced, the ring can be provided with a securing mechanism on a mating surface with the socket (such as a threaded portion), which further adds to the cost and complexity of the dental anchor assembly.

FIGS. 15A and 15B illustrate removable overdenture assemblies. As can be seen the prosthesis 1900, comprises a gingival flange 1910 that covers and is supported by the gums 1908. Male caps 1902*a, b, c,* and *d* are placed within prosthesis 1900 and mate with female abutments 1904*a, b, c,* and *d* to anchor the prosthesis 1900. Abutments 1904*a, b, c,* and *d* are typically screwed into implants 1906*a, b, c,* and *d*. The caps 1902*a, b, c,* and *d* form a retentive force with the abutments 1904*a, b, c,* and *d* that holds the prosthesis in place; however, the retentive force is necessarily such that it can be overcome so the prosthesis can be removed for daily cleaning. While four implant assemblies are illustrated in FIG. 15A, it is not uncommon for only two implant assemblies to be used for removable overdentures.

FIG. 15B is another example of a removable denture assembly that uses a bar 1914 to form an implant-supported, removable denture assembly. As can be seen the bar includes, or couples with implants 1906*a, b, c,* and *d*, and can accommodate abutments 1904*a, b, c,* and *d*. Prosthesis 1900, with flange 1910, can then "snap" down on abutments 1904*a, b, c,* and *d*. The assembly of FIG. 15A is referred to as an implant-retained denture assembly, while the assembly of FIG. 15B is an implant-supported denture assembly.

As noted above, an annular ring (not shown), or retention head as described below with respect to FIGS. 6-10, can be included within the caps 1902*a, b, c,* and *d*. But issues may still persist as described.

Another problem with removable denture assemblies is that over time the tissue can recede.

These issues can be addressed with permanent or fixed dentures, which are basically denture devices that consist of a row of prosthetic teeth connected to a framework that is held in position by dental implants and is only removable by a clinician (non-patient removable). A typical procedure for placement of permanent dentures involves an oral examination of the patient's dentition, followed by scanning of the jawbone to determine the precise locations for implant placements—two in the anterior region and two at the back of the jawbone at minimum. The permanent dentures will be affixed to the implants following the healing period, during which time the implants would biologically fuse to the jawbone via osseointegration.

FIGS. 16A and 16B illustrate various example fixed denture assemblies. As can be seen in FIG. 16A, prosthesis 2000 is similar to prosthesis 1900, but does not include a gingival flange. This is because prosthesis 2000 does not come out and there must be some room to clean under prosthesis 2000 and over gums 2008. But as with prosthesis 1900, prosthesis 2000 can be attached to abutments 2004*a, b, c,* and *d*, which can in turn be screwed or otherwise couple with implants 2006*a, b, c,* and *d*. But again, unlike the assembly of FIGS. 15A and 15B, prosthesis 2000 is typically affixed to the abutments 2004*a, b, c,* and *d* via screws 2012 that screw into abutments 2004*a, b, c,* and *d* form the top of prosthesis 2000.

FIG. 16B is another example of a fixed denture assembly that uses a bar (not shown), which is common. As can be seen the bar includes, or couples with implants 2006*a, b, c,* and *d*, and can accommodate abutments 2004*a, b, c,* and *d*.

The screws 2012, abutments 2004*a, b, c,* and *d*, and implants 2006*a, b, c,* and *d*, are metal, which raises the cost, but also result in several metal on metal interfaces that can lead to alignment and seating issues. While the idea is that the fixed appliance 2000 is tightly coupled to the base assemblies, i.e., abutments 2004, b, c, and *d*, and implants 2006, *b, c,* and *d*, such that the appliance 2000 cannot move, there are always, e.g., cantilever and other forces that act on the appliance 2000. Moreover, it is sometimes necessary to remove a fixed dental appliance, which can create wear on the metal on metal interfaces. Because the metal on metal interfaces are so rigid, and the appliance is not supported by soft tissue as in the case of removable, these forces are dissipated through the weaker appliance 2000, which can eventually lead to cracking of the appliance 2000.

FIG. 16B illustrated another example fixed denture assembly that includes additional metal, screw retained parts 2005, which can increase costs even further and further exacerbate the problems described.

Another problem with conventional fixed denture assemblies is the need to remove up to 15 mm of vertical bone height to accommodate the stacked components and make room for the prosthesis.

Another problem with conventional fixed denture assemblies is related to the labor intensive clinician appointment for hygiene. Retaining screws must be located, uncovered and removed to free the appliance for cleaning. The process then must be repeated in reverse to reattach the appliance. This procedure has a risk of appliance fracture due to the through holes required for screw access and is often avoided unless another problem requires it. This is a disadvantage for the patient and their overall oral hygiene.

SUMMARY

According to one aspect, a dental assembly for a mouth of a patient is provided. The dental assembly can comprise an implant having an upper portion and a lower portion, wherein the upper portion comprises a threaded portion configured to screw into a threaded recess of an abutment, and wherein the lower portion comprises an angled platform and a threaded post extending from the platform, the threaded post configured for threaded engagement with bone or tissue in the mouth of the patient, and the angled platform being angled relative to a line that is orthogonal to a length of the threaded post. It is contemplated that the threaded post can be angled relative to the threaded portion of the upper portion, for example, about 15 degrees, about 20 degrees, about 30 degrees, between 5-35 degrees, between 10-35 degrees, between 10-30 degrees, or between 15-30 degrees. In some aspects, the angled platform can be angled, for example, about 15 degrees, about 20 degrees, about 30 degrees, between 5-35 degrees, between 10-35 degrees, between 10-30 degrees, or between 15-30 degrees relative to a line that is orthogonal to a length of the threaded post. In some embodiments, the threaded post can comprise a single lead thread or multiple lead threads. In some embodiments, the threaded post can comprise opposing axial cuts adapted for self-tapping into the bone or tissue. In some embodiments, the implant can comprise a maximum outside diameter between about 1.5 mm and about 7 mm, between about 1.5 mm and about 6 mm, between about 2.4 mm and about 4.9 mm, or between about 1.5 mm and about 4.0 mm. In some embodiments, the threaded post can comprise two successive threads of different pitch. The dental assembly can further comprise a retention member having a first end and a continuous, unbroken skirt extending from the first end defining an inner surface for engagement over an outer locating surface of the abutment. In some aspects, the retention member can comprise a first end and a continuous, unbroken skirt extending from the first end defining an inner surface for fixed, non-patient removable engagement over an outer locating surface of the abutment. The retention member can be constructed of any suitable material(s), and in some embodiments can be constructed from a rigid material such that it provides a retentive force of about 10 to 75 pounds (e.g., PEEK). The dental assembly can further comprise a cap configured for securing in a dental appliance and engaging the retention member.

According to one aspect, a dental attachment assembly comprises an abutment member for attachment to a tooth root, implant, or adjacent tooth, a retention member for fixed, non-patient removable attachment to the abutment member, and a cap configured for securing in the recess in a dental appliance. The abutment member may have an upper end, and an outer locating surface portion projecting downwardly from the upper end, the outer locating surface portion being positioned to project above a tissue level when the abutment member is secured in a tooth root or implant. The retention member may have an upper end configured for engagement within a cap in a recess in a dental appliance, and a continuous, unbroken skirt projecting from the upper end of the retention member for engagement over the outer locating surface of the abutment member, the skirt having a rounded, convex outer surface, the retention member being constructed from a polyetheretherketone (PEEK) material or other rigid material such that it provides a retentive force of about 10 to 75 pounds. The abutment member and retention member may have mateable snap-engaging formations for releasable snap engagement when the retention member is attached to the abutment member. The cap may comprise a cavity for containing the upper end of the retention member, the cavity having a rounded concave inner surface. The concave inner surface of the cavity may allow for releasable snap engagement over the rounded outer surface of the skirt.

In some embodiments, the abutment member may have a head portion at the upper end and a shaft depending downwardly from the head portion. The shaft may be at a predetermined angle to the head portion (e.g., 10 degrees relative to a shaft extending straight downward, 20 degrees relative to a shaft extending straight downward, 30 degrees relative to a shaft extending straight downward, between 10-30 degrees relative to a shaft extending straight downward, or aligned with the head portion and extending straight down from the head portion). In some embodiments, the abutment member may have a socket projecting inwardly from the upper end of the abutment member and a retention head may project from the upper end of the retention member for releasable snap engagement in the socket. The retention head may have a lower end, with the skirt extending downwardly beyond the lower end of the retention head, whereby the skirt will contact the abutment member before the lower end of the retention head reaches the socket on re-insertion of the retention member into the abutment member. The abutment member may have a weep hole connecting the socket to the outside of the abutment member for allowing saliva to escape. In some embodiments, the mateable snap-engaging formations may comprise an outwardly bulging portion of the outer locating surface portion of the abutment member and a corresponding concave ring portion of an inner surface of the skirt of the retention member. In some aspects, the cap may comprise a generally cup shaped member having a central longitudinal axis, a top wall and an annular side wall extending away from the top wall, the top wall and side wall having an outer surface shaped to engage with the recess in the dental appliance, and wherein the cavity is configured for swivel engagement with the retention member adapted for non-swivel engagement over the outer locating surface of the abutment member attached to the tooth root, implant, or adjacent tooth. The top wall may have an interior top surface with a concave recess extending radially in an annular path along an outer annular peripheral portion of the interior top surface, the concave recess forming a curve having a first radius of curvature. The curve of the concave recess may continue along at least part of the inner surface of the side wall towards an open end of the rounded, concave inner surface of the cavity. The curve may be configured to provide swivel engagement with the retention member between a non-swiveled position in axial alignment with the central longitudinal axis of the retention member and a fully-swiveled position in which the central longitudinal axis of the cavity is at an angle to the central longitudinal axis of the retention member. The range of swivel of the cap over the retention member may be between 10-30 degrees, between 15-20 degrees, approximately 30 degrees, or at least 30 degrees.

According to one aspect, a dental attachment assembly, comprising: an abutment member for attachment to a tooth root, implant, or adjacent tooth, the abutment member having an upper end, and an outer locating surface portion projecting downwardly from the upper end, the outer locating surface portion being positioned to project above a tissue level when the abutment member is secured in a tooth root or implant; a male member (also referred to herein as retention member) for attachment to the abutment member, the male member having an upper end comprising a swivel joint for swivel engagement within a cap in a recess in a dental appliance, and a continuous, unbroken skirt projecting from the upper end of the male member for engagement over the outer locating surface of the abutment member, the skirt having a rounded, convex outer surface, the male member being constructed from a rigid material; the abutment member and male member having mateable snap-engaging formations for releasable snap engagement when the male member is attached to the abutment member; and a cap for securing in a recess in a dental appliance, the cap having a cavity for containing said swivel joint, the cavity having a rounded, concave inner surface for releasable snap engagement over the rounded outer surface of the skirt, the swivel joint and cap cavity together comprising means for permitting swivelling of the cap over the male retention member relative to the dental appliance. In some aspects, the outer locating surface portion can be outwardly tapered at least adjacent the upper end of the abutment member for centering the male member over the abutment member as the members are secured together. In some aspects, the rigid material is PEEK. In some aspects, the male member is constructed from a rigid material such that it provides a retentive force of about 10 to 75 pounds.

According to another aspect, a dental attachment assembly comprises: an abutment member with a first end shaped to attach to a tooth root, implant or adjacent tooth, and a second end with an outer locating surface, wherein the outer locating surface of the abutment member has at least two axially spaced retention portions comprising two generally rounded, annular projections; a retention member having a first end and a continuous, unbroken skirt extending from the first end defining an inner surface for engagement over the outer locating surface of the abutment member, the retention member being constructed from a rigid material (e.g., PEEK) such that it provides a retentive force of about 10 to 75 pounds, wherein the retention member has at least two axially spaced, snap engaging formations on the inner surface of the skirt for releasable snap engagement with the respective retention portions of the abutment member, and wherein the axially spaced, snap engaging formations on the inner surface of the skirt comprise two spaced, annular grooves for snap engagement over the annular projections on the abutment member; and a cap with a rounded, concave inner surface defining a cavity to receive the retention member, wherein the cap is configured for securing in a dental appliance. In some embodiments, the cavity can be configured to receive a swivel engagement with the retention member, for example, wherein an interior top surface of the cavity includes a concave recess extending radially along an outer periphery of the interior top surface of the cavity. In some embodiments, the at least two axially spaced retention portions of the abutment member can comprise two spaced, annular grooves, and the at least two axially spaced, snap engaging formations on the inner surface of the skirt can comprise two generally rounded, annular projections. In some embodiments, the assembly can comprise a central portion of the interior top surface that protrudes vertically into the cavity, and the retention member can be in direct contact with the central portion. In some embodiments, a curve of the concave recess continues along a side wall of the rounded, concave inner surface defining the cavity. The concave recess can curve at a plurality of varying angles along the side wall and the interior top surface of the cavity. The concave recess can be composed of a series of consecutive tangent circular arcs, which can one or more of increase in size from the interior top surface to the bottom portion of the cap, and comprised of circles of increasing size from a top portion of the cap to a bottom portion of the cap. The concave recess can provide a retention member with an angle correction of up to, for example, approximately 30 degrees. The cap can have any suitable diameter and height, including for example, an outer diameter of approximately 5.4 mm, and a height of approximately 2.3 mm.

According to another aspect, a dental assembly comprises: an endosseous dental implant comprising: (i) a first end portion having a top and a bottom, the first end portion comprises: (1) an external projection extending from the top of the first end portion for releasable engagement with an abutment member, wherein the abutment member has a lower portion; and (2) an annular cuff portion defining an annular seat; and wherein the lower portion of the abutment member contacts and seats on the annular seat to form a line of connection when the abutment member is releasably engaged with the external projection, wherein the line of connection is located slightly below a patient's gum line when the implant is secured in the mouth of the patient; and (ii) a threaded post which extends from the bottom of the first end portion for direct engagement into the patient's bone or tissue; b) a retention member having a first end and a continuous, unbroken skirt extending from the first end defining an inner surface for fixed, non-patient removable, engagement over an outer locating surface of the abutment member, the retention member being constructed from a rigid material such that it provides a retentive force of between 10 to 75 pounds, wherein the rigid material comprises PEEK; and c) a cap configured for securing in a dental appliance and engaging the retention member. In some aspects, the threaded post can be angled relative to at least one of the first end portion, the external projection, and the abutment member. In some aspects, the threaded post can be angled relative to the annular seat.

According to another aspect, a dental assembly comprises: a) an endosseous dental implant comprising: (i) a first end portion having a top and a bottom, the first end portion comprises: (1) an external projection extending from the top of the first end portion for releasable engagement with an abutment member, wherein the abutment member has an external lower bevel portion; and (2) an annular cuff portion defining an annular seat having a recessed, inwardly tapered bevel surface, wherein the tapered bevel surface surrounds the external projection; and wherein the lower bevel of the abutment member contacts and seats on tapered bevel surface of the annular seat to form a line of connection when the abutment member is releasably engaged with the external projection, wherein the line of connection is located slightly below a patient's gum line when the implant is secured in the mouth of the patient; and (ii) a threaded post which extends from the bottom of the first end portion for direct engagement into the patient's bone or tissue; b) a retention member having a first end and a continuous, unbroken skirt extending from the first end defining an inner surface for engagement over the outer locating surface of the abutment member, the retention member being constructed from a rigid material (e.g., PEEK) such that it provides a retentive force of about 10 to 75 pounds; and c) a cap configured for securing in a dental appliance and engaging the retention member. It is contemplated that the threaded post can be straight, or can be angled relative to at least one of the first end portion and the abutment member. For example, the threaded post can be angled between 10-20 degrees, about 15 degrees, between 25-35 degrees, or about 30 degrees relative to at least one of the first end portion and the abutment member. In some embodiments, the threaded post comprises a single lead thread or multiple lead threads. In some embodiments, the threaded post comprises opposing axial cuts adapted for self-tapping into the patient's bone or tissue. In some embodiments, the dental implant has a maximum outside diameter between about 1.5 mm and about 4.0 mm. In some embodiments, the threaded post comprises two successive threads of different pitch. In some embodiments, the annular cuff portion may be of different heights to accommodate different tissue depths. In some embodiments, the external projection can include a tool-receiving bore extending inwardly from an upper end of the projection.

According to another aspect, a dental assembly comprises: a dental appliance comprising a first recess and a second recess; a first cap for securing in the first recess and a second cap for securing in the second recess; a first abutment member for attaching to a first tooth root, implant, or adjacent tooth, and a second abutment member for attaching to a second tooth root, implant, or adjacent tooth; a first retention member sized for engagement within the first cap, the first retention member having a first end and a continuous, unbroken skirt extending from the first end defining an inner surface for engagement (e.g., non-patient removable, fixed engagement) over the outer locating surface of the first abutment member, the retention member being constructed from a rigid material (e.g., PEEK) such that it provides a retentive force of about 10 to 75 pounds; and a second retention member sized for engagement within the second cap. In some embodiments, the second retention member comprise a first end and a continuous, unbroken skirt extending from the first end defining an inner surface for engagement over the outer locating surface of the second abutment member, the retention member being constructed from a rigid material (e.g., PEEK) such that it provides a retentive force of about 10 to 75 pounds. All suitable abutment members, caps, and retention members are contemplated, including any or all of the abutment members, caps, and retention members described above or in the detailed description. In some aspects, a first attachment assembly can have at least one component that is of a different type than a component of the second attachment assembly. For example, a retention member of the first attachment assembly can be of a different type than a retention member of the second attachment assembly. In some aspects, a first attachment assembly can have all of the same component types as the second attachment assembly.

In some aspects of embodiments comprising a dental appliance, the first abutment member comprises an upper end, and the outer locating surface of the first abutment member is positioned to project about a tissue level when the abutment member is secured in the first tooth root, implant, or adjacent tooth, wherein the first retention member comprises an upper end for engagement within the first cap, wherein the first abutment member and first retention member have mateable snap-engaging formations for releasable snap engagement when the first retention member is attached to the first abutment member, and wherein the first cap comprises a cavity for containing the swivel joint, the cavity having a rounded, concave inner surface for releasable snap engagement over the rounded outer surface of the skirt, the swivel joint and cap cavity together comprising means for permitting swivelling of the first cap over the first retention member relative to the dental appliance. In some aspects, the outer locating surface of the first abutment member may be outwardly tapered at least adjacent the upper end of the first abutment member for centering the first retention member over the first abutment member as they are secured together. In some aspects, the first abutment member may have a socket projecting inwardly from the upper end of the abutment member and a retention head may project from the upper end of the first retention member for releasable snap engagement in the socket. In some aspects, the outer locating surface may have an outward taper from the upper end of the first abutment member and terminate at a predetermined location above the tissue level when the first abutment member is secured in a patient's mouth. In some aspects, the first abutment member may comprise a generally cylindrical head having a lower end spaced below the upper end of the first abutment member. In some aspects, the skirt of the first retention member may have an inner surface of predetermined height which is concave and does not contact the outer locating surface portion of the first abutment member along at least a major portion of the height of the inner surface when the first retention member and first abutment members are secured together. In some aspects, the first cap can comprise a generally cup shaped member having a central longitudinal axis, a top wall and an annular side wall extending away from the top wall, the top wall and side wall having an outer surface shaped to engage with the first recess in the dental appliance.

In some aspects of embodiments comprising a dental appliance, the first abutment member may comprise a first end shaped to attach to the first tooth root, implant or adjacent tooth, and a second end with the first outer locating surface, wherein the first outer locating surface of the first abutment member has at least two axially spaced retention portions comprising two generally rounded, annular projections, wherein the first retention member has at least two axially spaced, snap engaging formations on the inner surface of the skirt for releasable snap engagement with the respective retention portions of the abutment member, and wherein the axially spaced, snap engaging formations on the inner surface of the skirt comprise two spaced, annular grooves for snap engagement over the annular projections on the first abutment member, and wherein the first cap comprises a rounded, concave inner surface defining a cavity to receive a swivel engagement with the first retention member; wherein an interior top surface of the cavity includes a concave recess extending radially along an outer periphery of the interior top surface of the cavity. A central portion of the interior top surface may protrude vertically into the cavity, and the first retention member may be in direct contact with the central portion. In some aspects, a curve of the concave recess may continue along a side wall of the rounded, concave inner surface defining the cavity. The concave recess may curve at a plurality of varying angles along the side wall and the interior top surface of the cavity. Additionally or alternatively, the concave recess may be composed of a series of consecutive tangent circular arcs.

In some aspects of embodiments comprising a dental appliance, the assembly further comprises an endosseous dental implant. The implant may comprise (i) a first end portion having a top and a bottom, the first end portion comprises: (1) an external projection extending from the top of the first end portion for releasable engagement with the first abutment member, wherein the first abutment member has an external lower bevel portion; and (2) an annular cuff portion defining an annular seat having a recessed, inwardly tapered bevel surface, wherein the tapered bevel surface surrounds the external projection; and wherein the lower bevel of the first abutment member contacts and seats on tapered bevel surface of the annular seat to form a line of connection when the abutment member is releasably engaged with the external projection, wherein the line of connection is located slightly below a patient's gum line when the implant is secured in the mouth of the patient; and (ii) a threaded post which extends from the bottom of the first end portion for direct engagement into the patient's bone or tissue. The threaded post may be angled (e.g., between 10-20 degrees, about 15 degrees, between 25-35 degrees, about 30 degrees) relative to at least one of the first end portion and the first abutment member.

In some aspects of embodiments comprising a dental appliance, the assembly further comprises an implant comprising an upper portion and a lower portion; wherein the upper portion comprises a threaded portion configured to screw into a threaded recess of the first abutment member; and wherein the lower portion comprises an angled platform and a threaded post extending from the angled platform, the threaded post configured for threaded engagement with bone or tissue in the mouth of the patient, wherein the angled platform is angled relative to a line that is orthogonal to a length of the threaded post.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

The dental attachment assembly described in U.S. Pat. No. 9,931,181 (the '181 Patent), which is incorporated herein by reference as if set forth in full, functions similar to a fixed dental attachment system as described above, yet can be more easily removed by a dental professional using a special tool and which overcomes many of the problems of conventional fixed dental attachment assemblies. The dental attachment assembly described in the '181 Patent is useful to attach a dental appliance, not intended to be removable by the patient, such as a denture, with an implant and provide a retentive force of about 8 to 75 pounds, while also providing ease of engagement of the retention member with the abutment due to the compressible nature of the materials used and the friction-retained snap-fit of the ball and socket components included within the assembly.

As will be described in detail below, the retention member is formed from a compressible material—such as a polymer or soft metal—to allow the retention member to compress and flex while being attached or detached from an abutment secured to the implant. The compressible and flexible retention member can then be secured with the abutment at a variety of angles, which is often necessary when securing a dental appliance to a plurality of implants extending at different angles across a person's upper or lower mandible. Additionally, the compressible ball eliminates the need for a separate compressible annular ring to be positioned in the socket of the abutment between the retention member and interior abutment walls, as well as the need for a securing mechanism for securing the annular ring to the abutment walls. The dental attachment assembly is therefore easier to manufacture and requires less maintenance once inserted.

Figure 1:
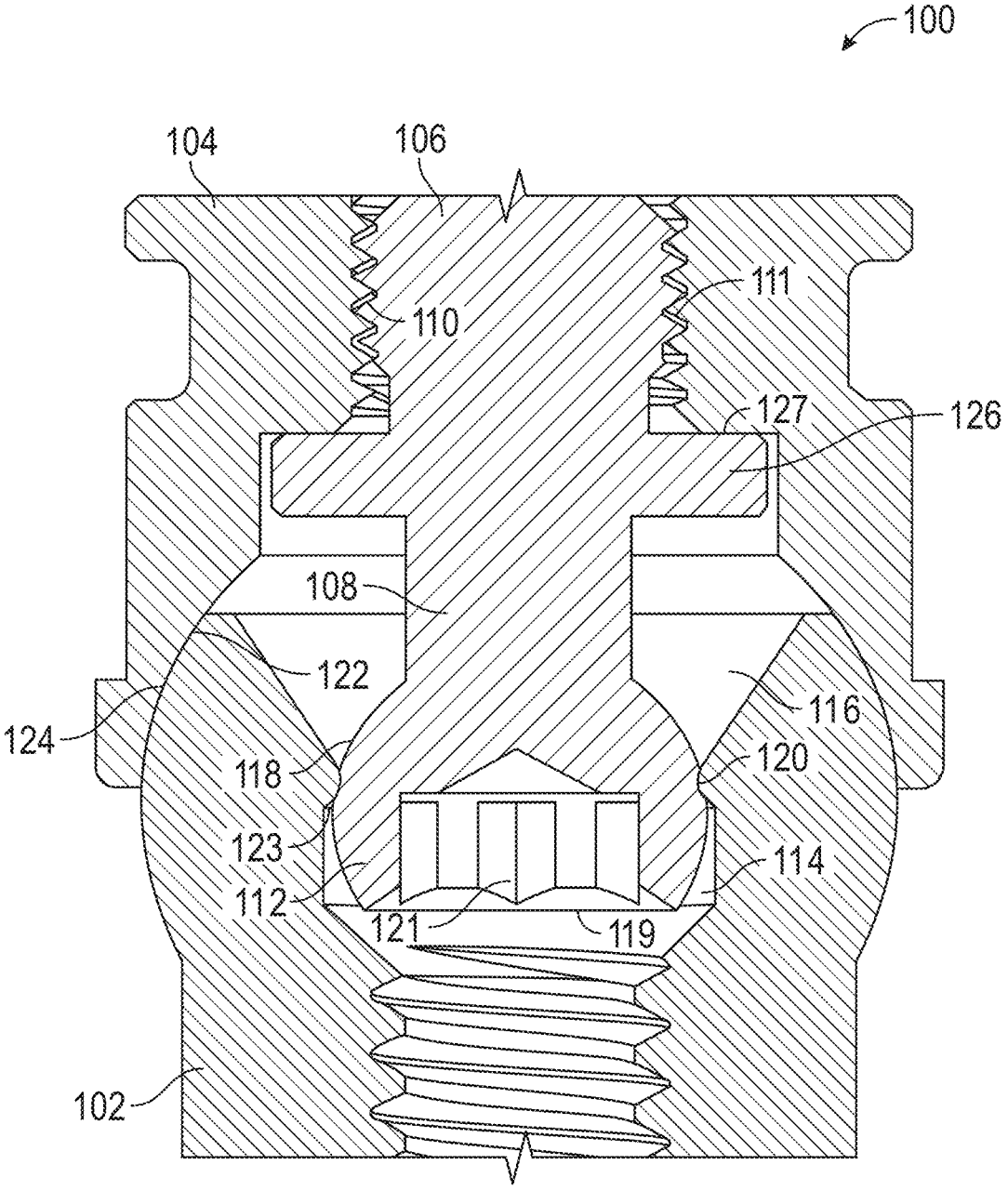
FIG. 1 illustrates one embodiment of a dental anchoring or attachment assembly that can be attached or otherwise coupled with an implant that can be anchored to a bone or other base structure such as a tooth root, according to an embodiment.

FIGS. 1-5 herein are the same as FIGS. 1-5 of the '181 Patent. FIG. 1 illustrates one embodiment of a dental anchoring or attachment assembly 100 that can be attached with an implant (not shown) that can be anchored to a bone or other base structure (not shown) such as a tooth root. The assembly includes an abutment 102 that is secured to the implant and a cap or denture attachment housing (DAH) 104 that is secured in a recess of a dental appliance. A retention member 106 serves to provide the frictionally-retained connection between the cap 104 and the abutment 102. To this end, the retention member 106 includes a shaft 108 that, e.g., has a threaded end portion 110 in a threaded connection with a corresponding threaded bore 111 in the cap 104. A second end of the shaft, which interfaces with the abutment 102, includes a head 112 that is substantially spherical in shape and which is configured to create a frictional fit with an inward projection or barb 120 in a socket 114 found in an upper opening 116 of the abutment 102.

The head 112 includes a curved surface 118 configured to frictionally engage an annular inward projection 120 in the socket 114, and a flat lower end face 119 with, e.g., an inwardly directed hexagonal or polygonal shaped recess 121 for engagement with a suitable tool when the retention member 106 is threadably engaged in bore 111 of cap 104. The inward projection 120 has an undercut 123 that is engaged with the head 112. The socket 114 does not necessarily need to be curved to match the curved surface 118 of the head 112. Instead, the head 112 is in contact with the socket 114 only at projection 120 in most or all attachment orientations. In the embodiment of FIG. 1, the outer surface of the head 112 is convex, while the outer end face 119 of the head is flat in order to provide for a closer fit of the head 112 with the abutment 102. The inward projection 120 is configured to have a friction fit with the corresponding diameter of the head 112 at the mouth of the socket 114.

One benefit of the compressible material for the retention member 106 is that the diameter of the head 112 can be altered to increase or decrease the retentive force provided by the frictional-fit or compression of the head 112 engaging with undercut barb 123 of annular projection 120. The greater the maximum diameter of head 112, the higher the retentive force, since the inward projection 120 cuts further into the head when fully engaged. A smaller diameter head 112 provides less retentive force. Retention force may also be varied by using different, softer or harder compressible materials for head 112, as described in more detail in the '181 Patent in connection with the modified embodiment of FIGS. 31 to 35C therein.

Figure 2:
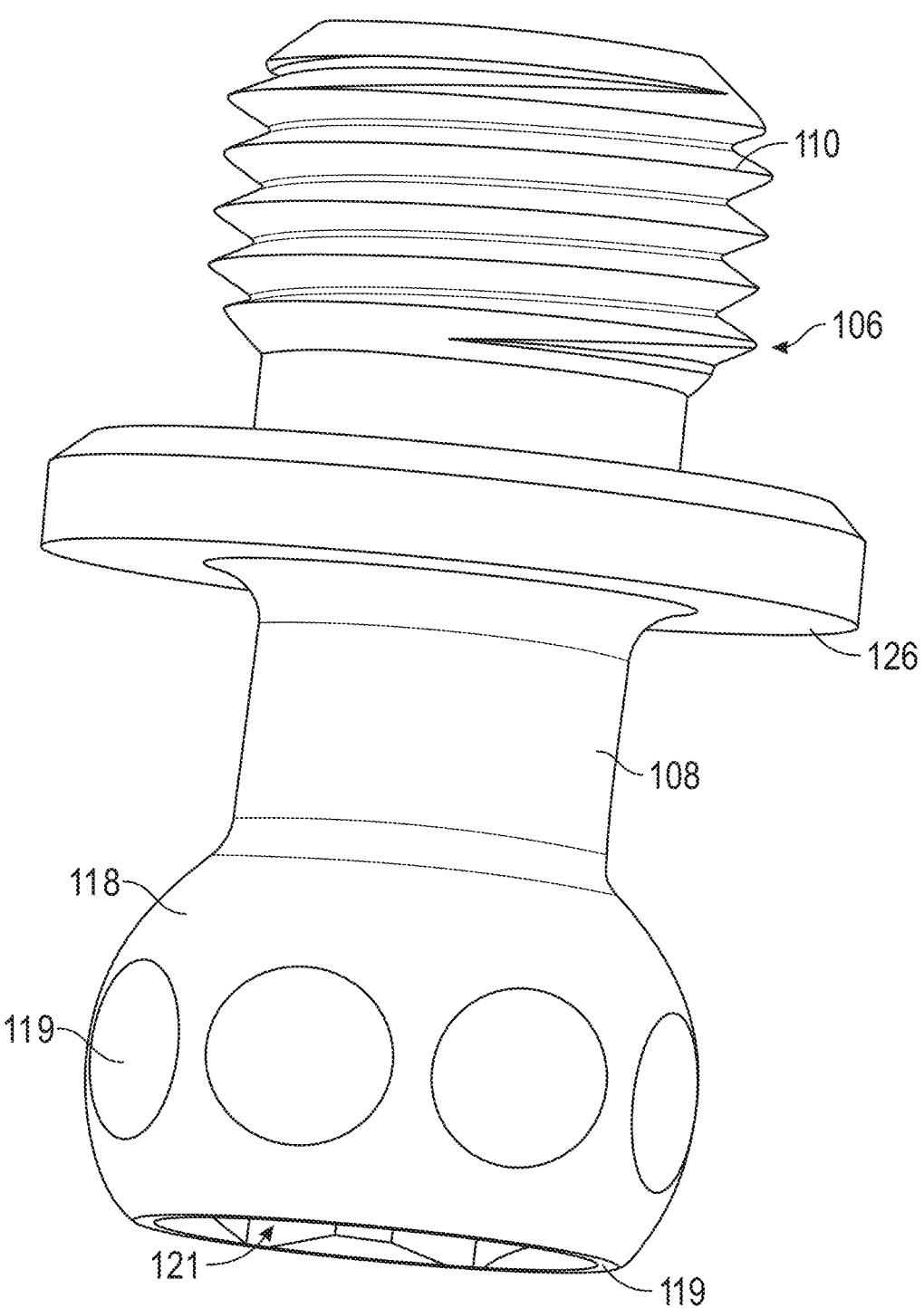
FIG. 2 illustrates the external surface of the head of a retention member, according to an embodiment.
Figure 3:
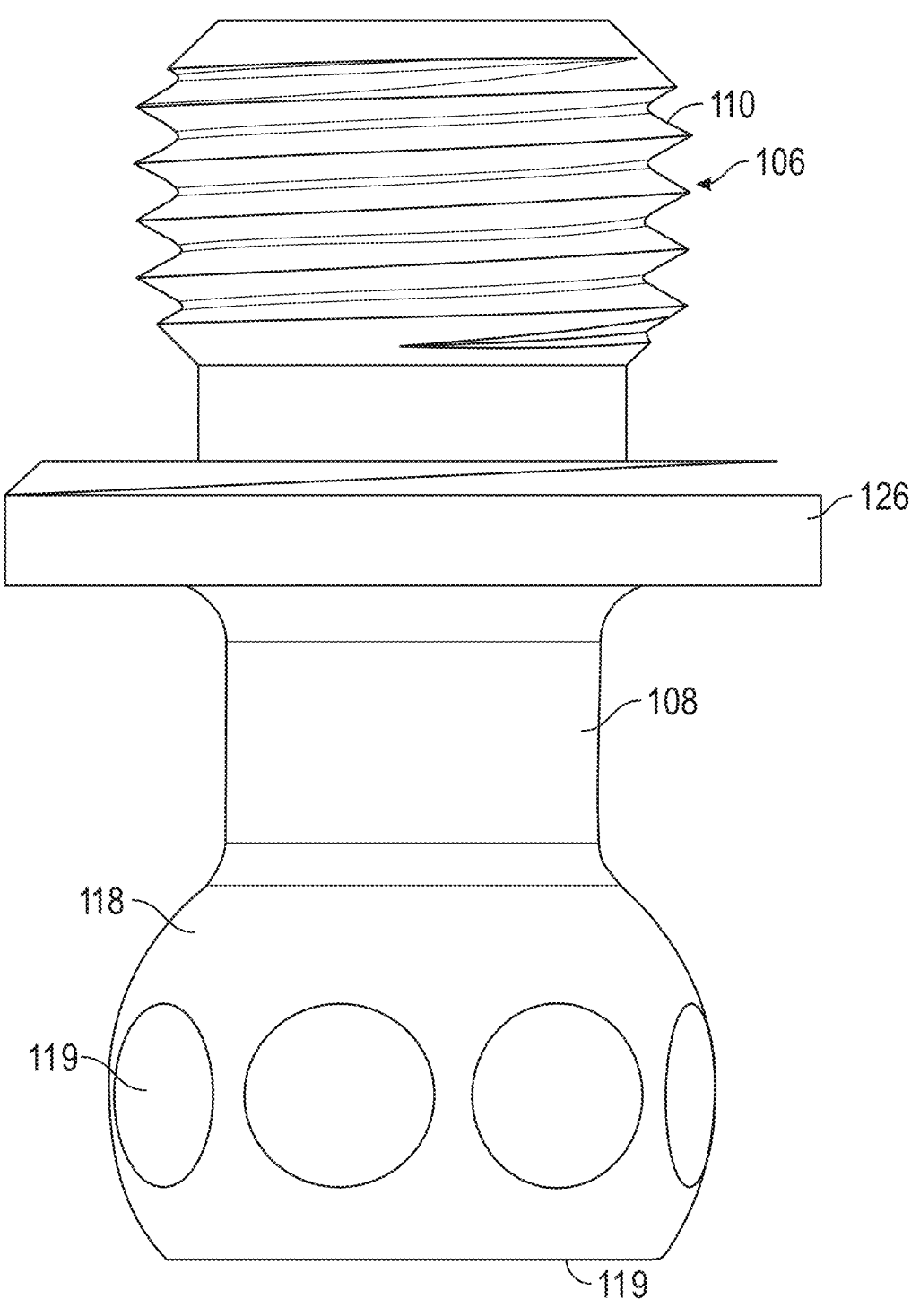
FIG. 3 illustrates another view of the external surface of the head of the retention member of FIG. 2.

FIGS. 2 and 3 illustrate the external surface of the head 112 of one embodiment of retention member 106. The outer ball-shaped or convex curved surface 118 can have a series of flats or flattened portions 119 around the circumference of surface 118 to reduce the amount of friction between the curved surface 118 of the head and the corresponding curved surface or projection 120 of the socket. In an alternative embodiment, no flats are provided and the head has a smooth outer convex surface. A smooth convex surface increases the amount of friction between head 112 and projection 120, since the projection digs more deeply into the compressible surface of the head in the attached configuration of FIG. 1. Thus, one, two, or all of the following parameters can be used to vary the retention force of the head in the abutment socket: head diameter, head shape, and the selected compressible material of the head. The retention force may vary from anywhere between about 10 to about 75 pounds, although some embodiments may provide as little as about 1 pound of retention force for use in the initial positioning of the dental appliance and dental anchoring device.

The cap 104 is configured with an annular internal surface 122 which may be curved to engage with a corresponding curved outer surface 124 of the abutment, providing an additional frictional fit for the dental attachment assembly.

In one embodiment, a ball flange 126 is provided on shaft 108 at a predetermined spacing below threaded portion 110. Flange 126 extends perpendicular to the axial direction of the shaft 108 and acts as a stop by engaging an opposing surface 127 of the cavity in cap 104 when threaded stem 110 is threaded into bore 111. The ball flange 126 serves to help locate the ball 112 within the socket 114 and cap 104 and prevent vertical movement of the assembly.

In the embodiment described herein, the retention member 106 can be formed from a compressible or elastomeric material such as a polymer or a soft metal, non-limiting examples of which include polymers such as polyether ether ketone (PEEK), polyoxymethylene or acetal polymers such as Delrin®, and soft metals such as nickel titanium (nitinol), pink TiCN (titanium carbo nitride) or titanium. The soft metal can be a coating on the surface of the head portion in some embodiments. In one embodiment, the surfaces may be coated with a gold nitride coating to reduce friction.

Figure 4:
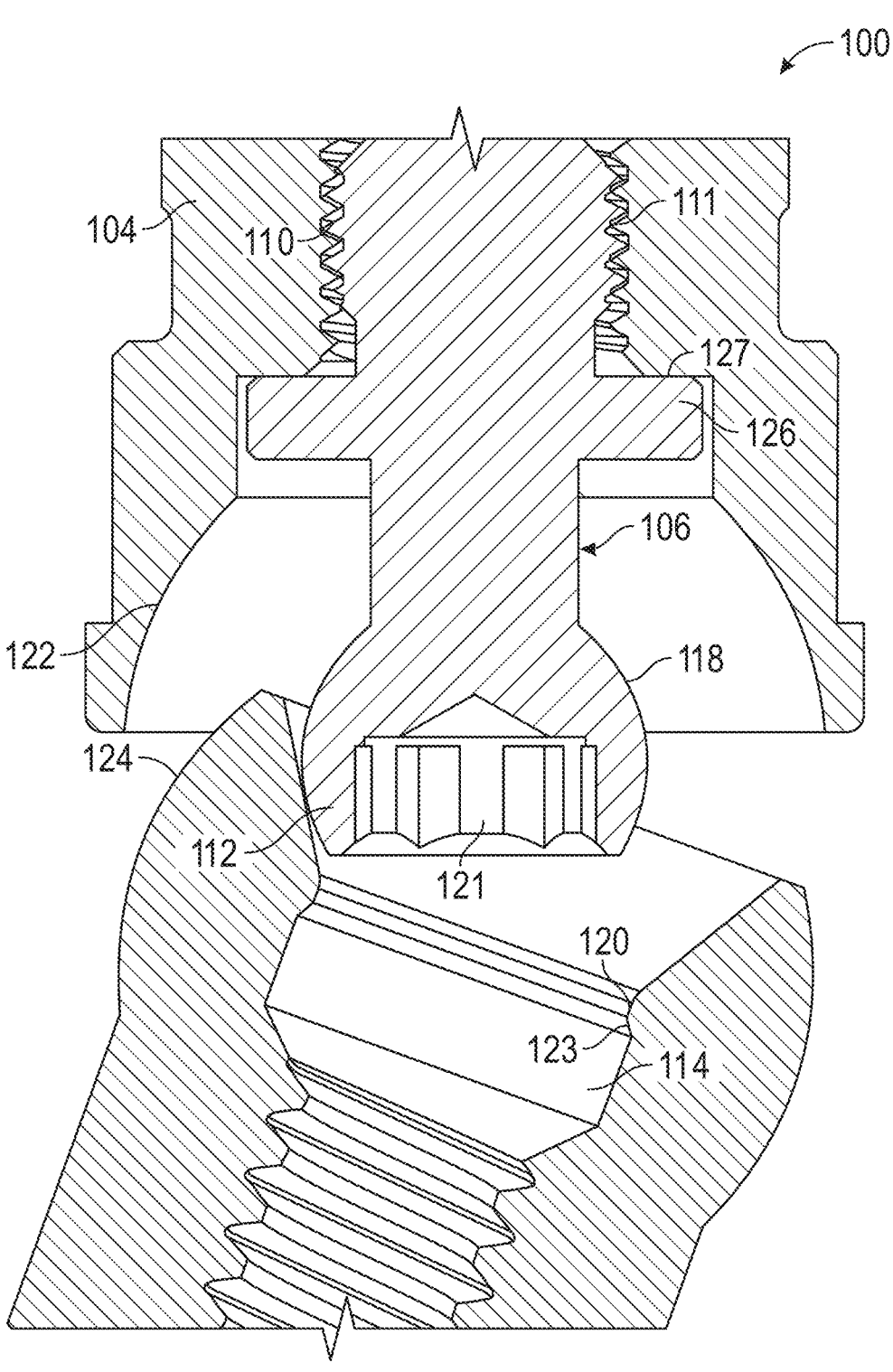
FIG. 4 illustrates a dental attachment assembly in an angled, removed configuration, according to one embodiment.

FIG. 4 illustrates the dental attachment assembly in an angled, unattached configuration prior to full insertion of head 118 in socket 116, 114, illustrating the varying angles at which the retention member 106 may be snap-fit into the abutment. In practical applications, the implant may protrude from the bone or tooth root at varying angles from the ideal vertical angle due to the structure of the bone or the placement of the implant during surgery. The dental anchoring or attachment assembly therefore corrects any angular displacement by rotation of the head 112 in the socket 114.

In one embodiment, the angle of approach of the head with respect to the abutment may vary up to about 20 degrees in any direction from the vertically-aligned orientation shown in FIG. 1. In combination with another implant also offset at a similar angle, the dental anchoring device may therefore provide as much as about 40 degrees of angle correction.

Figure 5:
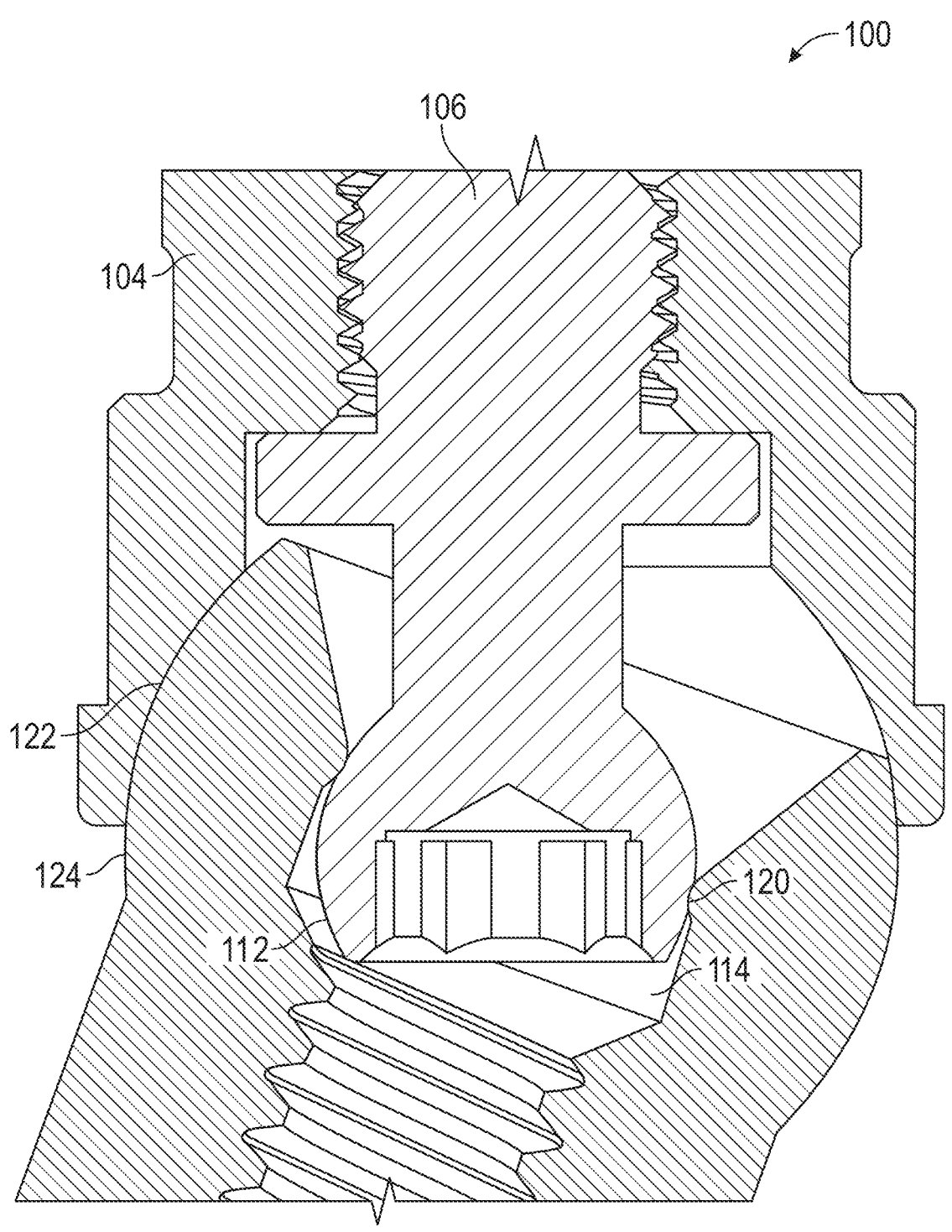
FIG. 5 illustrates the dental attachment assembly in the angled orientation shown in FIG. 4 but where the retention member is now snap-fit into the socket of the abutment.

FIG. 5 illustrates of the dental attachment assembly in the angled orientation shown in FIG. 4 but where the retention member 106 is now snap-fit into the socket 114 of the abutment 102. As illustrated in FIG. 5, the head 112 may be secured within the socket 114 despite the differential angle. Furthermore, the annular surface 122 of the cap 104 is also still frictionally engaged around the outer curved surface 124 of the abutment with the offset indicated in FIG. 5, and the annular projection 120 is frictionally engaged at an angle around the opposing annular surface portion of head 118.

While the dental attachment assembly was a huge step forward for fixed dental assemblies in that it eliminated weakening through holes in the appliance and replaced the screwed together interfaces with the retention member 106 made of compressible or elastomeric material such as a polymer or a soft metal, non-limiting examples of which include polymers such as polyether ether ketone (PEEK), polyoxymethylene or acetal polymers such as Delrin®, and soft metals such as nickel titanium (nitinol), pink TiCN (titanium carbo nitride) or titanium, it is not interchangeable with a removable or fixed appliance and still requires expensive component swaps to convert from one to the other, and can have a restoration height of 15-18 mm.

FIGS. 6-10 are recreations of FIGS. 1-5 of U.S. Pat. No. 6,030,219 (the '219 Patent), which is incorporated herein by reference in its entirety, and which illustrate a removable dental attachment assembly 10 for attaching a dental appliance to an implant 12. The design illustrated in FIGS. 6-10 present improvements that overcome the deficiencies with removable assemblies described above. The assembly comprises a female socket member or abutment element 14 and a male retention member or element 16 which has a swivel engagement in a cap 18 secured in a dental appliance or prosthesis. The female element 14 is of relatively strong material such as titanium coated with titanium nitride, pink TiCN (titanium carbo nitride), DLC (diamond like coating) or similar material. Element 14 has an enlarged upper end portion 20 having an upwardly facing socket 26, and a downwardly threaded shaft or stem 22 for attachment to an implant fixture 12 secured in the bone of an upper or lower dental arch. In FIGS. 6-10, the stem 22 is threaded for engagement in a threaded cavity in an implant fixture 12. It will be understood that the female element will be provided in multiple thread configurations and diameters for engagement in any of the various implant fixtures currently available on the market.

Figures 6, 7, 8, 9, 10:
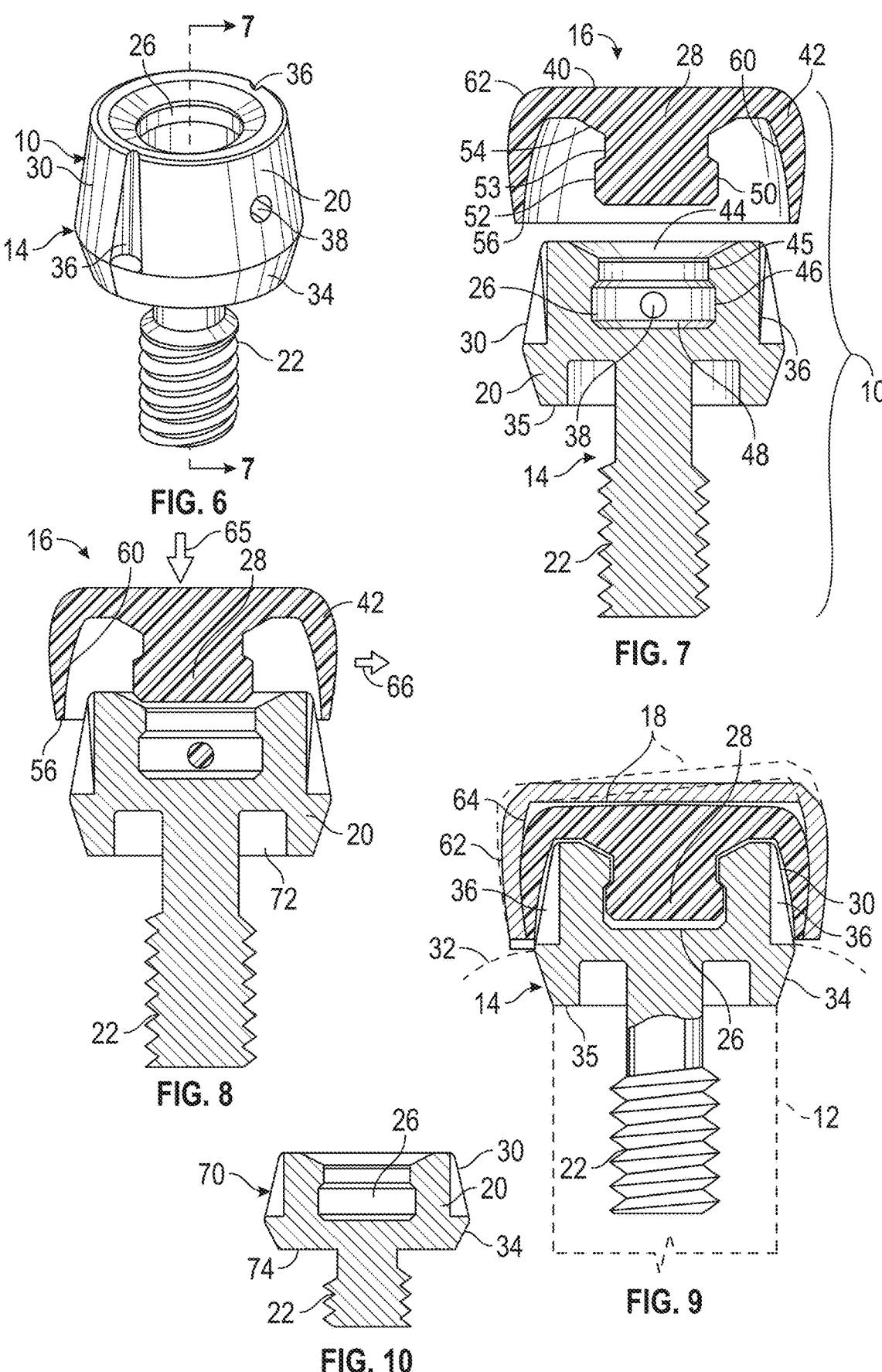
FIG. 6 illustrates an abutment member of a removable dental attachment assembly for attaching a dental appliance to an implant, according to one embodiment.
FIG. 7 illustrates a sectional view taken on line 7-7 of FIG. 6, with a retention member shown separated, according to an embodiment.
FIG. 8 is a view similar to FIG. 7, showing the retention member of FIG. 7 aligning with the abutment member of FIG. 6, according to an embodiment.
FIG. 9 is a view similar to FIGS. 7 and 8, including a cap and showing the retention member of FIG. 7 coupled to the abutment member of FIG. 6, according to an embodiment.
FIG. 10 is a sectional view showing a shortened form of the abutment member of FIG. 6, according to an embodiment.

The upwardly facing socket 26 is of suitable shape and dimensions for releasable snap engagement with a downwardly depending retention head 28 on the male element 16. The mating shapes of the socket 26 and head 28 are similar to that described in U.S. Pat. No. 5,417,570 (the '570 Patent), the contents of which are incorporated herein by reference, and will have a similar action. An outer locating surface 30 of the upper end portion 20 projects upwardly above the tissue level 32 when the female element is secured to an implant or tooth root, as best illustrated in FIG. 9. Locating surface 30 preferably has a slight inward taper from a position just above the tissue level up to the upper end of end portion 20. The surface portion 34 below the gum level may be cylindrical or have a slight inward taper such that the diameter at the lower end 35 of upper end portion 14 matches that of the implant 12, as indicated in FIG. 9.

A pair of diametrically opposed, axially extending notches 36 can be provided on the locating surface 30. These are designed for engagement with an insertion tool (not illustrated) for holding the implant or female element 14 and threading it into a matching socket in an implant fixture 12. The female element or abutment 14 also can have a weep hole 38 connecting the socket 26 to the outer surface of element 14, as best illustrated in FIGS. 6 and 7.

Unlike retention member 106 described above, which must be fairly inelastic in order to provide the retentive force needed for a fixed assembly, the male element 16 is formed of a material having some resilience, preferably nylon plastic that provides for some level of elastic reformation when the denture is removed and reattached.

The upper surface 40 is generally flat, and a skirt 42 projects downwardly from the upper surface 40 to surround the retention head 28. The retention head 28 has an outer shape substantially matching that of the socket 26. Socket 26 has a tapered leading edge or rim 44, a reduced diameter portion 45, an enlarged ring groove portion 46, and a lower chamfer edge portion 48. Head 28 of the male element has a matching shape with a chamfer 50 at the lower end, an annular ring portion 52 of enlarged diameter for snap engagement in groove portion 46, a reduced diameter portion 53, and an outwardly tapered upper end portion 54.

The skirt 42 has a lower end 56 which projects below the lower end of head 28, and an inner surface 60 which is tapered, preferably at an angle of around 10°, and is also concave, as best illustrated in FIG. 9. The dimensions of the skirt and the head are such that the lower end 56 of the skirt will contact locating surface 30 before the lower end of the head contacts the female element, as best illustrated in FIG. 8. The outer surface 62 of skirt 42 is convex or rounded, for snap-fit, swiveling engagement in a cavity 64 of corresponding shape in the cap 18, as best indicated in FIG. 9. This provides a swiveling, rotational movement or hinging action at the cap, where the attachment is secured to the denture or appliance, reducing wear, in a similar manner to that described in the '570 Patent. The pivoting of the nylon or resilient male in the metal denture cap 18 allows minor corrections for non-parallel abutments, as well as providing a longer lasting, resilient connection.

The denture or appliance can be removed repeatedly for cleaning, simply by snapping male head 28 out of socket 26, and can then be re-inserted. On re-insertion in the direction of the arrow 65 in FIG. 8, for example, the user may fail to align head 28 co-axially with socket 26. In this case, the lower end of skirt 42 will contact one side of the locating surface 30 before the head 28 reaches the socket. Further downward movement in the direction of the arrow 65 urges the male element to one side, in the direction of arrow 66, to align head 28 properly with the socket. Thus, the locator surface portion 30 of the female element together with the inner locating surface of skirt 42 act to urge the head 28 into proper alignment with the socket prior to snap insertion in the socket. This avoids the problem of the nylon head potentially hitting the tapered rim 44 of the socket if mis-aligned, which would eventually cause damage to the softer head and decrease retention ability. The skirt and locator surface also allow easier location and insertion of the dental prosthesis by the patient.

The female element 14 can be provided in several tissue cuff heights to match the surrounding gingival level 32. The minimum height of the overall attachment assembly is much lower than that of the arrangement as described in the '570

Patent and that of a fixed assembly such as described with respect to FIGS. 1-5. The minimum height for a non-hexed implant abutment will be of the order of 1.75 mm, while the minimum height for a hexed implant abutment will be around 2.75 mm, which will help in cases where the implant is at tissue level. This is lower than the height of all such attachments currently on the market today, and has the advantage of providing a much lower profile and increased patient comfort. Other heights will also be provided depending on the depth of the tissue. The low profile above the attachment is also better for tooth placement.

By providing external notches 36 for engagement with an insertion tool, rather than an internal hex indent or the like as in the '570 Patent, the height of the female element can be reduced. The notches allow the female element to be held firmly for threading into the implant fixture 12.

The weep hole 38 can be located above the tissue level, which makes it easier for saliva to escape from socket 26, reducing hydraulic pressure as a result of the male head engaging in the socket. This also allows easier connection of the male and female elements. Once the head 28 is in snap engagement in the socket, as in FIG. 9, the skirt will only contact the locator surface portion 30 at the lower end, while the concave inner surface 60 will be spaced from surface portion 30 along the remainder of the attachment, as best illustrated in FIG. 9. This also enables easier insertion of the head 28 into the socket once the parts are in proper alignment.

FIG. 10 illustrates a modified female element or abutment 70 for attachment to a non-hexed implant (not illustrated). Element 70 can be used with the male element 16 of FIGS. 6-9 in a similar manner to hexed implant abutment 14, and like reference numerals have been used for like parts as appropriate. In this embodiment, head portion in FIG. 10 is shorter than in the previous embodiment, and the hex indent 72 of FIGS. 6-9 is eliminated, with head portion 20 instead having a flat, lower annular face 74 which fits against the flat upper face of the implant.

Figure 11A:
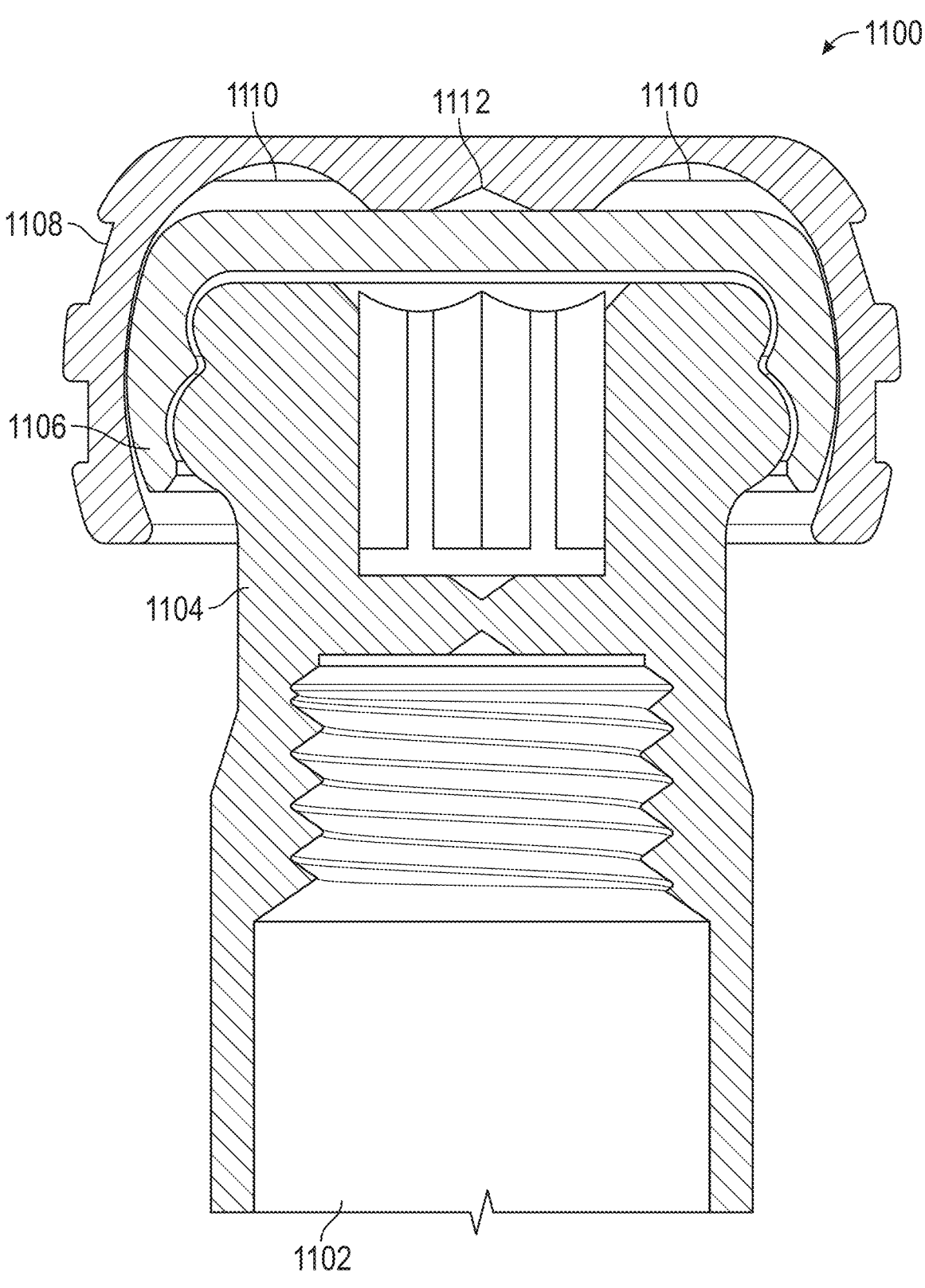
FIG. 11A illustrates another example embodiment of a removable dental assembly, according to one embodiment.
Figure 11B:
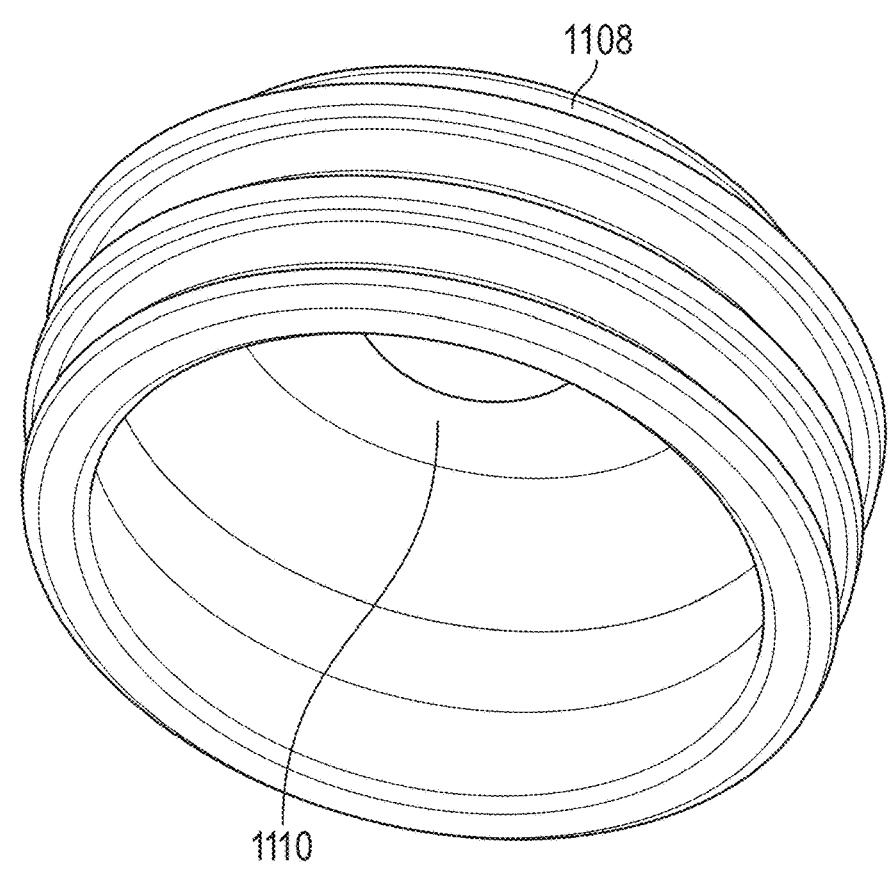
FIG. 11B is an isometric view illustration of the cap of the dental assembly of FIG. 11A.
Figure 11C:
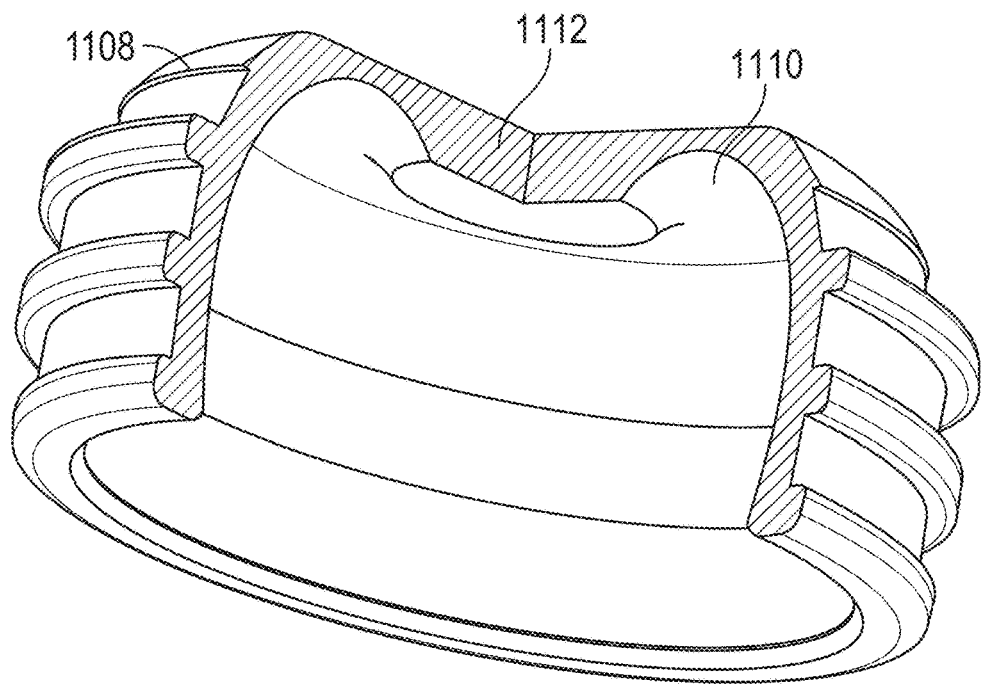
FIG. 11C is an isometric cutout view illustration of the cap of the dental assembly of FIG. 11B.

FIGS. 1-5 of U.S. Pat. No. 10,687,920 (the '920 Patent), which is incorporated herein in its entirety as if set forth in full, and recreated here as FIGS. 11A-G illustrate another example embodiment of a removable dental assembly that possesses the advantages of the removable assembly depicted with respect to FIGS. 6-10 and as described in the '219 Patent. But the assembly described in the '920 Patent also allows for increased swivel adjustment. As shown in FIG. 11A and more clearly in the isometric views in FIG. 11B and FIG. 11C, in one embodiment, an interior top surface of the cap 1108 is configured with a concave recess 1110 extending radially along an outer periphery of the interior top surface of the cavity. The concave recess 1110 allows the cap 1108 to swivel at a much greater angle with respect to the retention member 1106 and abutment 1104, which makes it easier for a person to secure the dental appliance onto the abutment 1104. A central portion 1112 of the interior top surface of the cap 1108 protrudes vertically into the cap cavity and minimizes vertical displacement between the retention member 1106 and the cap 1108 that would have occurred without the presence of the central portion 1112. In this exemplary embodiment, the cap is approximately 1.9 millimeters in height, although one of skill in the art will appreciate that the dimensions of the cap may vary.

In the embodiment illustrated in FIG. 11A, the retention member 1106 is retained by a skirt (or side wall) that projects from one end of the cap 1108 for releasable engagement of the retention member 1106 with the cap 1108, as disclosed in U.S. Pat. No. 6,981,871, incorporated herein by reference in its entirety. The outer locating surface of the abutment 1104 has at least two axially spaced retention surfaces for mating, snap engagement with corresponding spaced snap engagement formations on the inner surface of the retention member 1106, to provide a stacked, external retention between the abutment 1104 and retention member 1106.

Figure 11D:
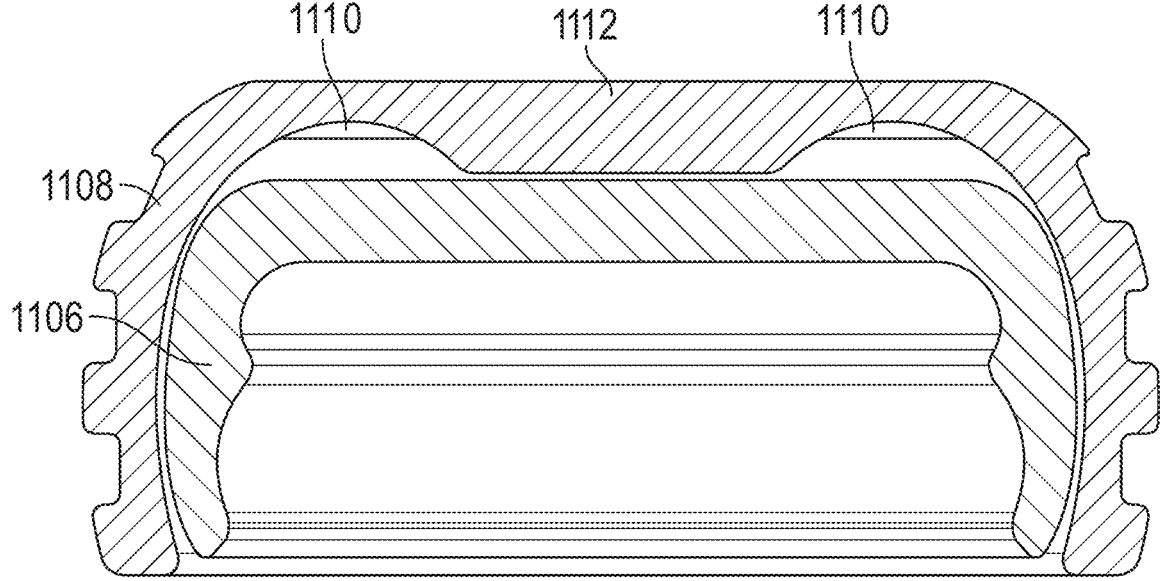
FIG. 11D is a sectional view illustration of the cap and a retention member of the dental assembly of FIG. 11A.

FIG. 11D illustrates a side cutout view of the cap 1108 and retention member 1106 in a non-swiveled position, which more clearly illustrates how the retention member 1106 fits within the cavity of the cap 1108 when no swiveling has occurred. The retention member 1106 is in contact with the central portion 1112 of the interior top surface of the cap 1108. Outer side walls of the retention member 1106 are generally curved to match the curved surface of the inner side walls of the cap 1108, and they may be in direct contact at a portion of the side walls at any one position to allow for ease of swivel without an excessive amount of friction.

Figure 11E:
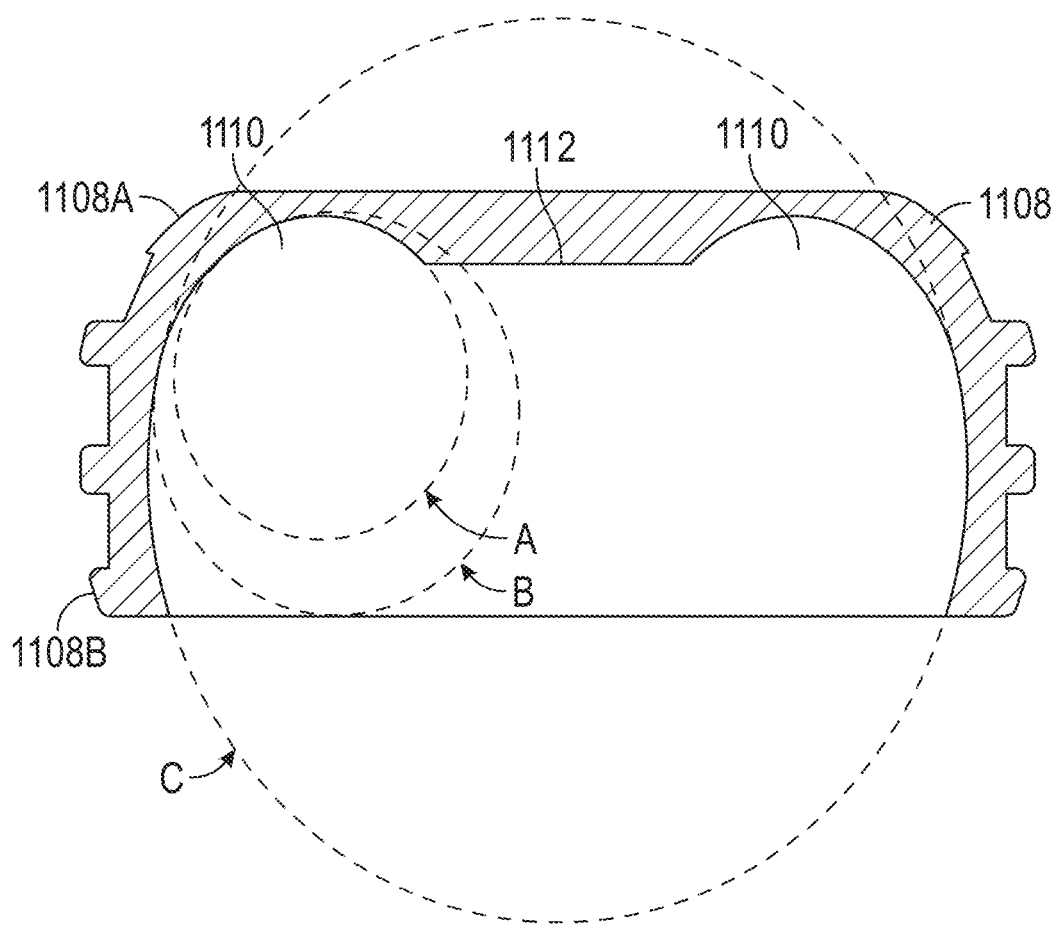
FIG. 11E is a sectional view illustration of the cap of the dental assembly of FIG. 11A illustrating consecutive tangent circle arcs which are used to create an angle of a concave recess on an interior wall of the cap.
Figure 11F:
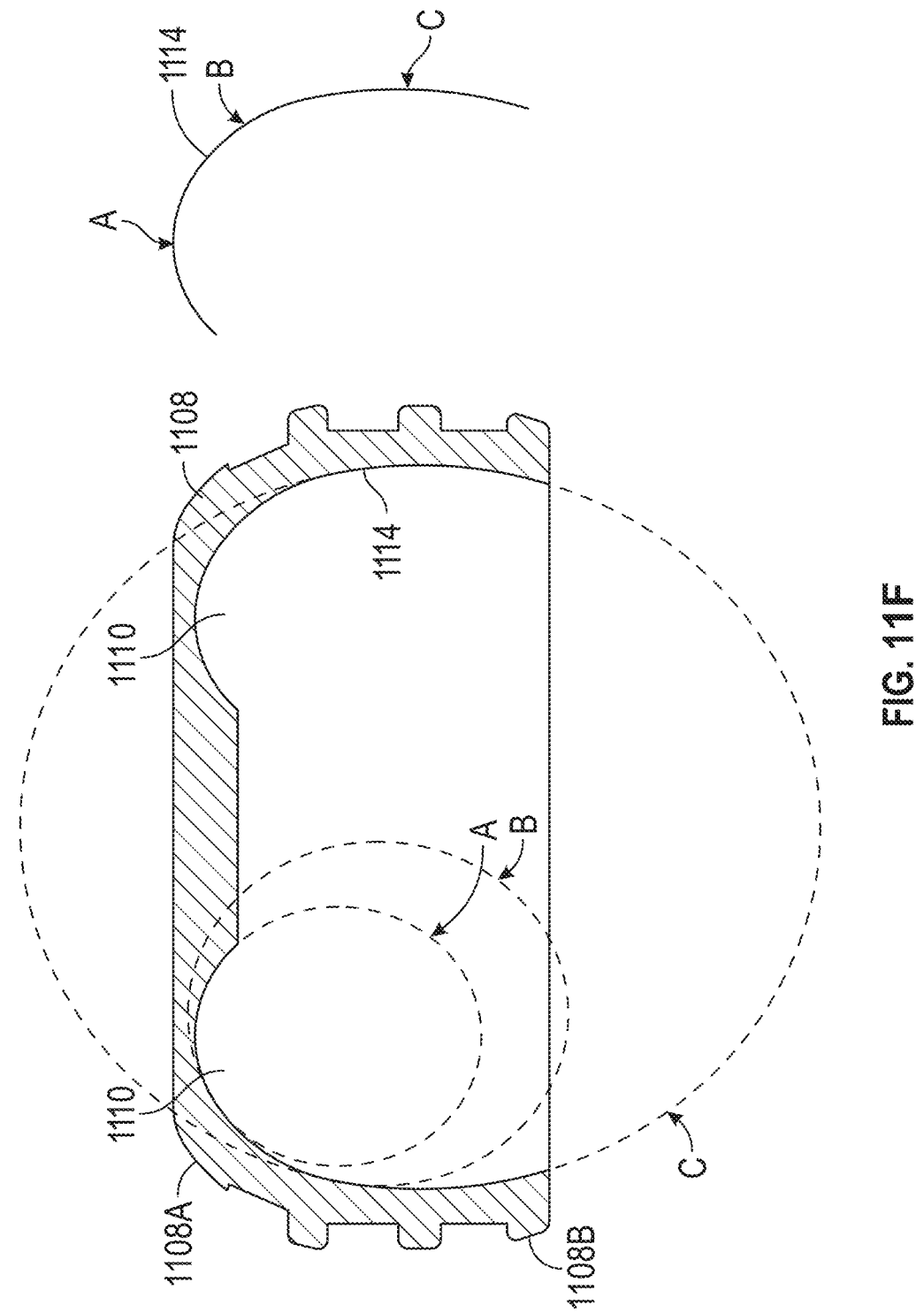
FIG. 11F is a sectional view illustration of the cap of the dental assembly of FIG. 11A illustrating an angle of the concave recess.
Figure 11G:
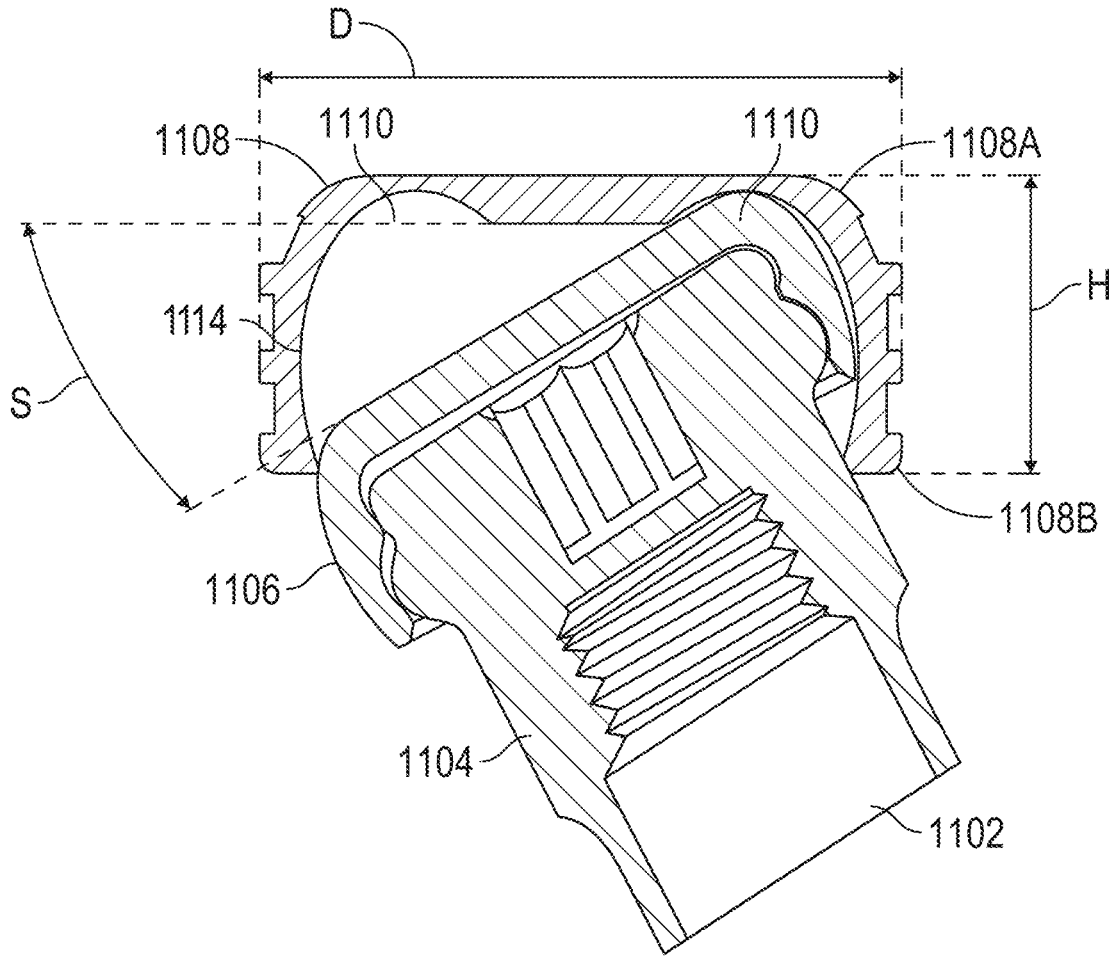
FIG. 11G is a sectional view of the dental attachment assembly of FIG. 11A in a fully swiveled position.

In one embodiment, the concave recess 1110 is specifically designed with a curvature 114 which may be formed using a series of consecutive tangent circular arcs formed from multiple circles of varying radii, as illustrated in FIG. 11E and FIG. 11F. In the embodiment illustrated herein, circles A, B, and C represent portions of the tangent circular arcs used to derive the curve 1114, although any plurality of circles may be used. The circles A, B, and C are arranged from large-to-small diameter from a bottom portion 1108B of the cap to a top portion 1108A of the cap to form the varying angles of the curve 1114. As illustrated in FIG. 11G, the curve 1114 is designed to optimize the swivel of the cap 1108 around the retention member 1106 while maintaining engagement of the retention member 1106 within the cap 1108. Varying diameters of each of the circles may be used as long as the diameters are arranged from large-to-small from a bottom-to-top direction along the interior side wall of the cap. In the exemplary embodiment of FIG. 11E, the concave recess 1110 is formed from circles A, B, and C with diameters of 0.067, 0.083 and 0.186 inches, respectively (i.e. radii of curvature of 0.034, 0.042 and 0.093 inches, respectively). Circle C has a diameter which intersects the concave recess 1110 on an opposing side of the cap, which therefore defines the diameter of the cap cavity. Each curvature of each circle intersects with a different portion of the concave recess 1110 to form a curved surface 1114 of varying degrees of curvature, as shown in FIG. 11F.

FIG. 11G illustrates one embodiment of the retention member 1106 and abutment 1104 in a fully swiveled position within the cap 1108, where a portion of the retention member 1106 has swiveled into the concave recess 1110 in the cap 1108. The opposing side of the retention member 106 has swiveled downward to the point that it is still retained within the cap 1108, which illustrates the complete range of swivel of the cap 1108 in one direction. In this embodiment, the range of swivel S is approximately 30 degrees with a cap having a diameter D of approximately 5.4 millimeters (mm) and a height H of approximately 2.3 mm, although one of skill in the art will appreciate that these dimensions may be varied and still achieve the same degree of rotation. The range of rotation may reasonably extend to approximately 32 degrees (e.g., between 15-20 degrees) and could be extended up to approximately 40 degrees if the dimensions of the cap, retention member and abutment are altered to allow for greater rotation—for example by increasing the height of the cap and reducing the diameter of the abutment. As with the assembly of FIGS. 6-10, the retention member 1106 is made of a resilient material such as nylon.

Figure 12:
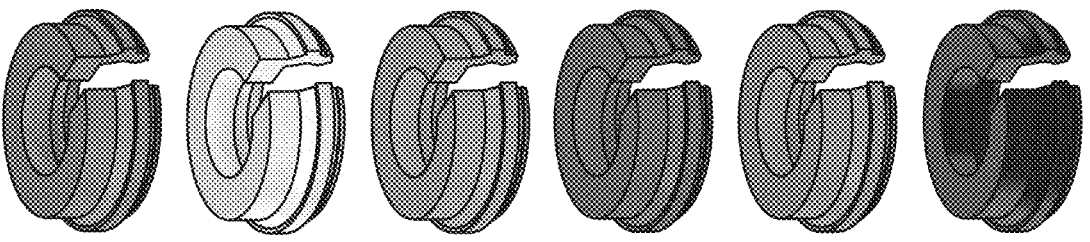
FIG. 12 illustrates a conventional PEEK retention member that includes a gap or slot cut into the retention member in order to allow for some resiliency.

It is generally understood that harder, less resilient material such as PEEK will not work for the retention member in a removable denture assembly, because whatever material is used, it needs to repeatedly deform and then reform as the dentures are removed and then reinstalled. PEEK simply is not resilient enough. Certain manufacturers have used PEEK for the retention member such with the Straumann® Novaloc® retentive system. But as illustrated in FIG. 12, such PEEK retention members must include a gap our slot cut into the retention member in order to allow for increased resiliency.

While using a solid PEEK retaining member in a removable assembly is counter intuitive, and would not work for a removable assembly, testing has shown that the use of a solid PEEK retaining member with caps and abutments as illustrated, e.g., with respect to the embodiments of FIGS. 6-10, 11A-G, 13, 14A-C can actually provide the benefits of such removable assemblies, i.e., lower cost, no surgical plan and the long term consequences thereof, lower restoration height, fewer components, elimination of screws and metal on metal interfaces, and greater alignment margin, in a fixed assembly. In other words, it has been shown that a PEEK retention member with the assemblies described above (e.g., in place of 16, 1106, 1706 and optionally having the same features and shapes of 16, 1106, 1706) provide the retention needed for fixed applications.

This represents a major leap forward for fixed assemblies as it not only allows for the advantages of removable assemblies, but it provides huge flexibility in restorative plans. In other words, the patient may start with removable and transition to fixed (or vice versa), although a retrofit is likely required as noted below. But maybe more importantly, it allows for a transition in the event of a failed fixed restoration to a successful removable restoration with minimal procedures and cost. A failed conventional fixed restoration failure can be emotionally and financially devastating as there is currently no ability to transition. The restoration plan can even change on the fly depending on surgical outcomes.

If a user has a removable assembly, then switching to a fixed implementation, then additional implants (e.g., 1904) may be required. The flange 1910 can be removed in the short term and the same removable prosthesis 1900 can be used at least in the short term, while a fixed prosthesis is made.

As noted above, the placement of the implants is important, as the placement and other factors can results in cantilever forces that can cause the prosthesis to crack. In certain instances, the patient's jaw may not allow an implant to be positioned far enough back in the patient's jaw to sufficiently address the potential for such forces. While the retention member 1106 of the embodiments described with respect to FIGS. 11A-G can allow for an angular displacement due to the up to 32 degrees swivel engagement (e.g., between 15-20 degrees swivel engagement), this may not be enough. Thus, the implant may need to be angled, such that the abutment is positioned even further back in the jaw.

Figure 13:
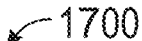
FIG. 13 illustrates one embodiment of a dental anchoring or attachment assembly, according to another embodiment.
Figure 13:
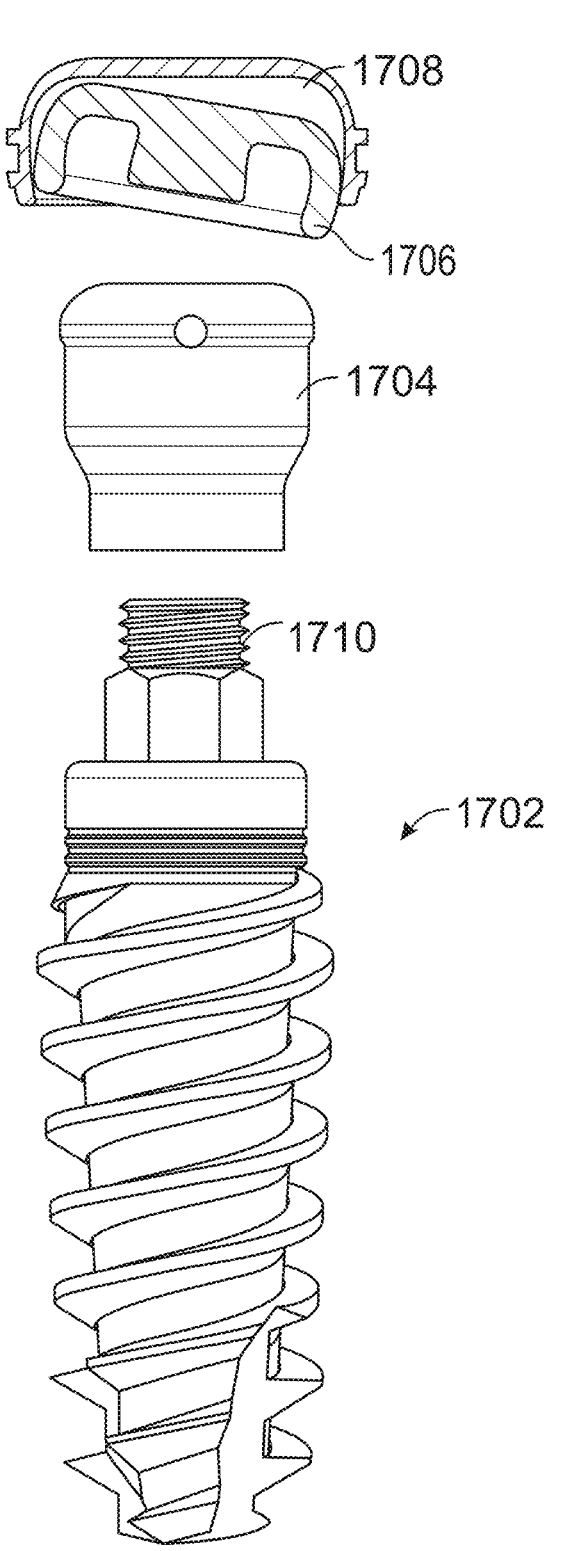
Figure 14A:
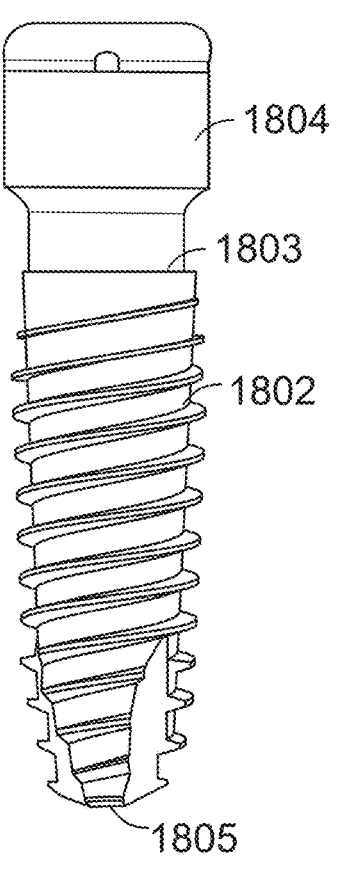
FIG. 14A illustrates a dental anchoring or attachment assembly with a lower portion configured to be straight.
Figure 14B:
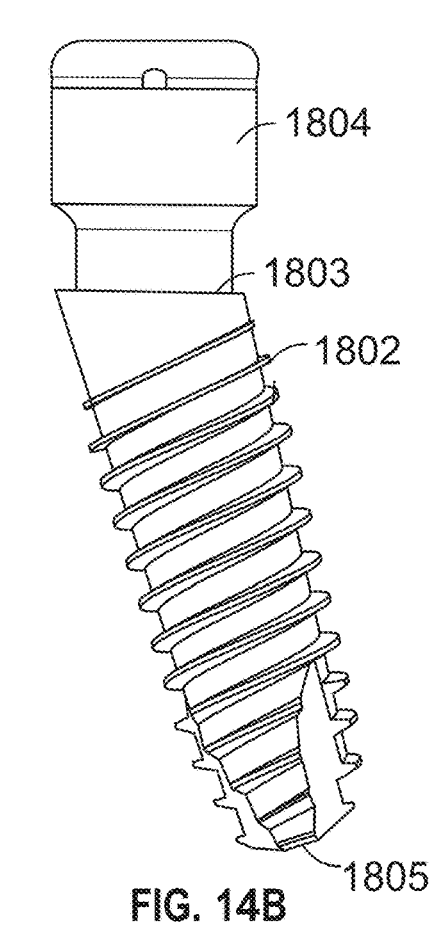
FIG. 14B illustrates the assembly of FIG. 14A with a lower portion configured to be angled.
Figure 14C:
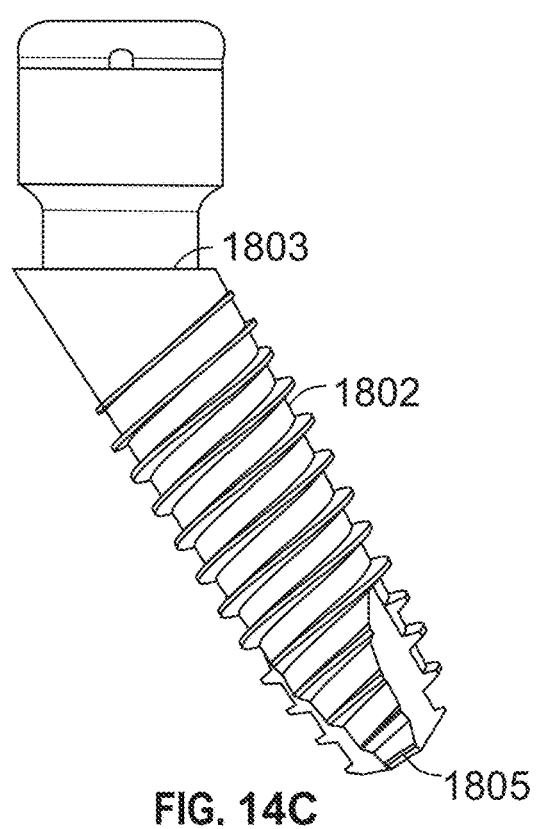
FIG. 14C illustrates the assembly of FIG. 14A with another lower portion configured to be angled.
Figure 15A:
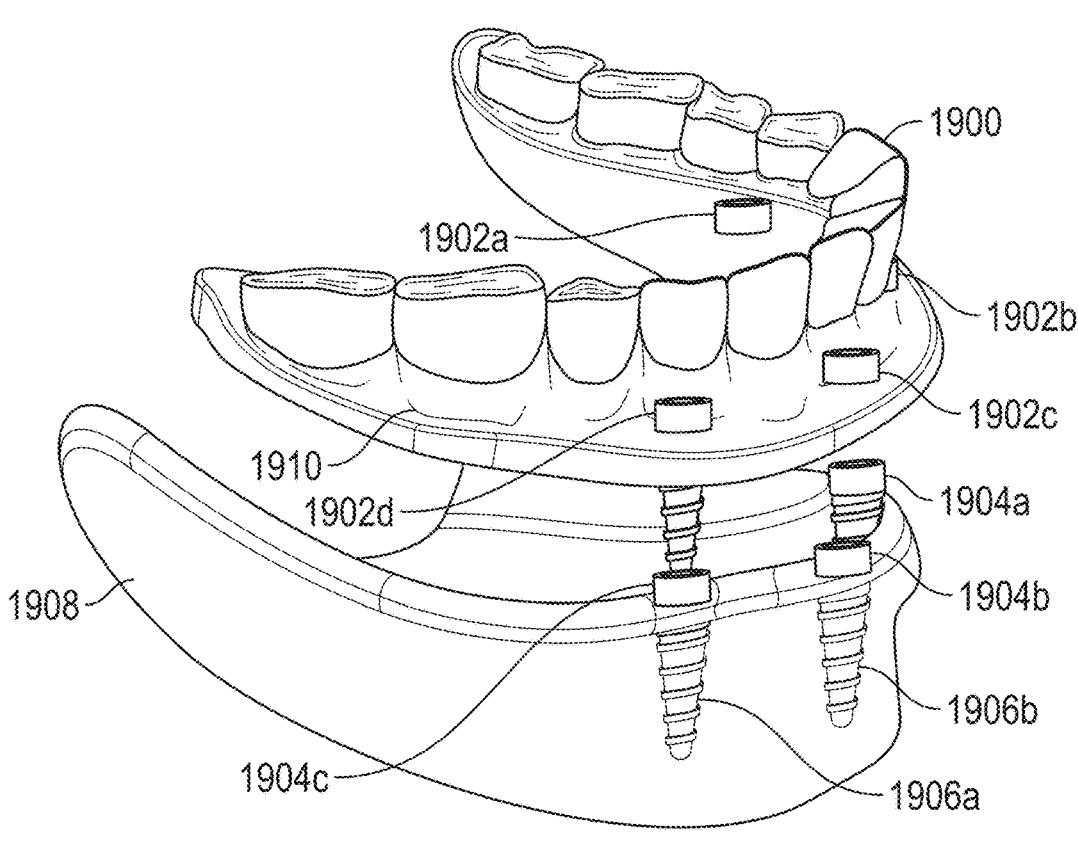
FIG. 15A illustrates a removable overdenture assembly, according to an embodiment.
Figure 15B:
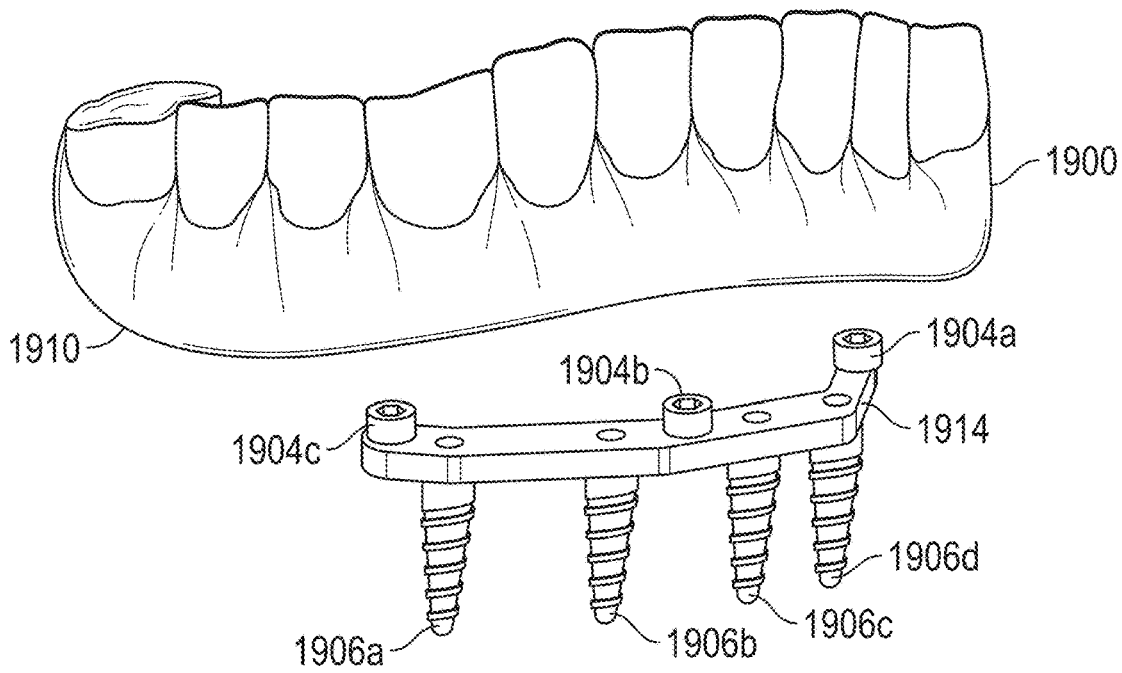
FIG. 15B illustrates a removable denture assembly that uses a bar, according to an embodiment.
Figure 16A:
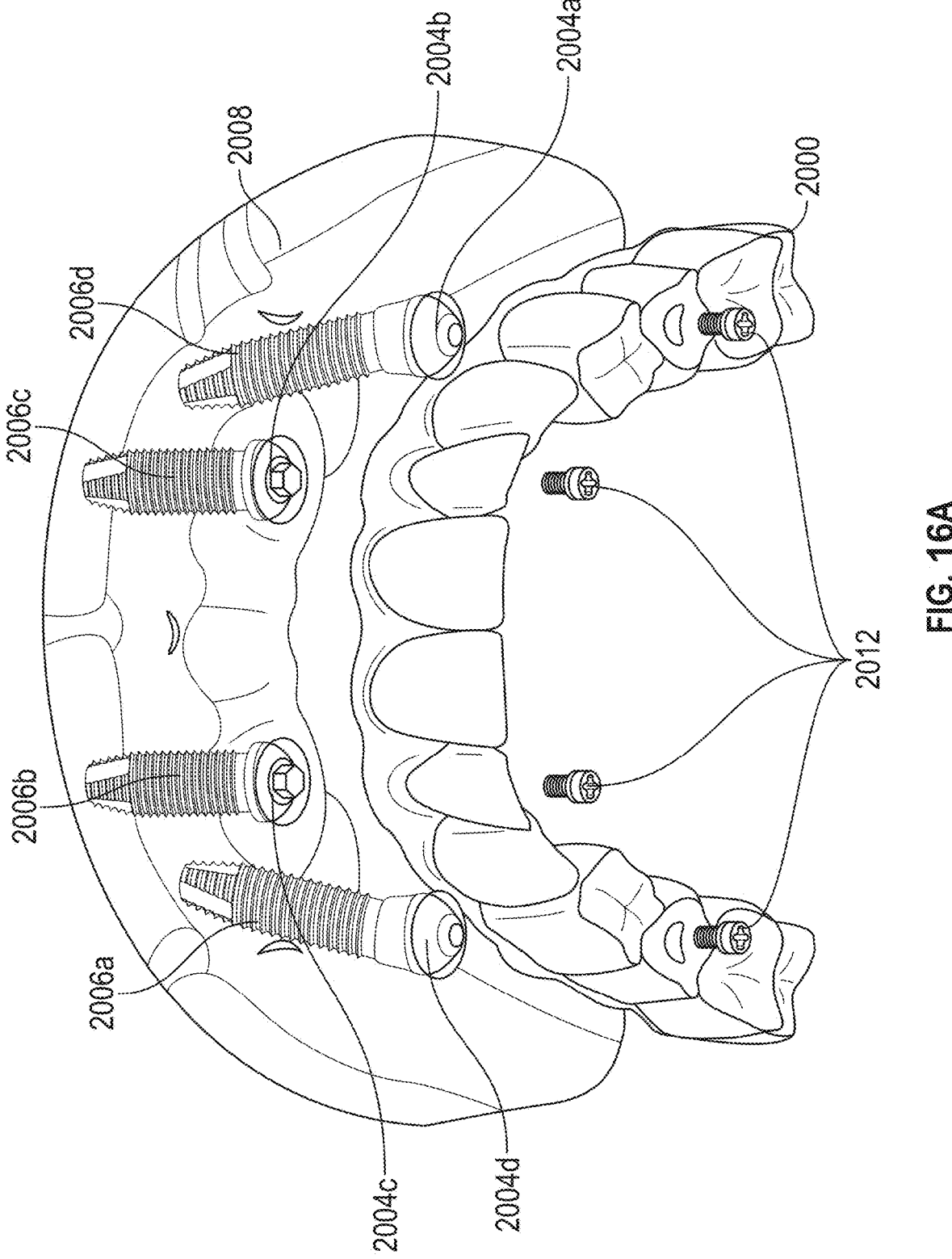
FIG. 16A illustrates a fixed denture assembly, according to an embodiment.
Figure 16B:
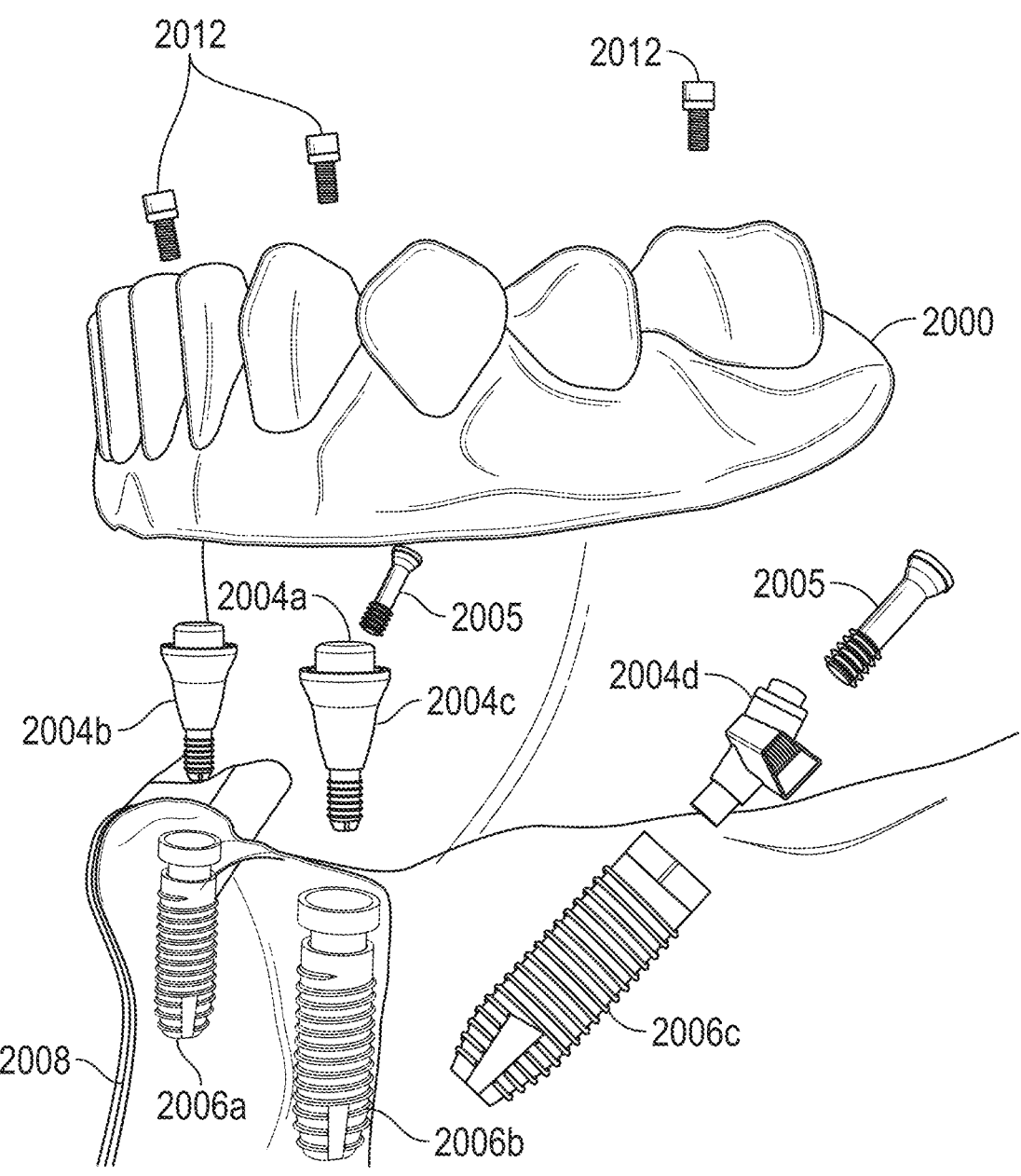
FIG. 16B illustrates another fixed denture assembly, according to an embodiment.

For example, FIG. 13 illustrates an assembly 1700 in which the implant 1702, screws into the abutment 1704 via threaded portion 1710 extending above a platform of implant 1702 (and complementary threads (not shown) in a recess of a bottom portion of abutment 1704), with retention member 1706 configured to removably couple with abutment 1704, and cap 1708 configured to removably couple with retention member 1706. But as illustrated in FIGS. 14A-C, the lower portion 1802 of implant 1702 can be configured to be straight (FIG. 14A) or at various angles such as between 10-30 degrees, between 5-35 degrees, between 15-30 degrees, between 10-35 degrees, 15 degrees (FIG. 14B), or 30 degrees (FIG. 14C), about 15 degrees (between 13.5-16.5 degrees), or about 30 degrees (between 27-33 degrees)—relative to a lower portion configured to extend straight down below from the abutment as shown in FIG. 14A. Viewed from another perspective, a line extending from a center portion of platform 1803 to a center portion of tip 1805 can align with and be positioned beneath a line extending from a central top portion of abutment 1804 to a central bottom of abutment 1804 (e.g., make a straight line), or a line extending from a center portion of platform 1803 to a center portion of tip 1805 can form an angle (e.g., between 145-175 degrees, between 145-170 degrees, between 160-170 degrees, 165 degrees, between 145-155 degrees, 150 degrees) with a line extending from a central top portion of abutment 1804 to a central bottom of abutment 1804.

In some embodiments, assembly 1700 can be similar to that described in, e.g., FIGS. 27-49 in U.S. Pat. No. 9,314, 318, which is incorporated herein by reference as if set forth in full. The upper portion of implant 1702 can comprise the threaded portion 1710, which is not visible in FIGS. 14A-14C. The lower portion (e.g., 1802) of implant 1702 can comprise a platform 1803 and a threaded post extending from the platform for threaded engagement with a patient's bone or tissue. In some aspects, implant 1702 can comprise a lower portion 1802 that includes an angled platform 1803. Threaded portion 1710 can be positioned above platform 1803 and screwed into the abutment (e.g., 1704 or 1804), as shown in FIGS. 14B-14C. In the straight embodiment of FIG. 14A, the platform is orthogonal or about (e.g., within 10% of) orthogonal to the length of the lower portion (from a center of platform 1803 to tip 1805). In the embodiments of FIG. 14B-C, the platform 1803 is angled relative to a line that is orthogonal to the length of the threaded post, for example, about 15 degrees, about 20 degrees, about 30 degrees, between 5-35 degrees, between 10-35 degrees, between 10-30 degrees, or between 15-30 degrees, or at any other suitable angle(s) relative to a line that is orthogonal to the length of the threaded post. The angled platform can advantageously allow for the threaded post or lower portion (e.g., 1802) of implant 1702 to be angled while threaded portion (e.g., 1710) extends substantially straight up (as in the embodiment of FIG. 13). Viewed from another perspective, the angled platform can advantageously allow for threaded post or lower portion of implant 1702 to be angled relative to the threaded portion 1710, for example, forming an angle of between 145-175 degrees, between 145-170 degrees, between 160-170 degrees, 165 degrees, between 145-155 degrees, or 150 degrees. Thus, abutment 1704 can couple with a straight and upwardly extending threaded portion 1710 of implant 1702 even when a threaded post or lower portion 1802 of implant 1702 is angled relative to abutment 1704, which allows the abutment, retention member or other components to be better seated onto the angled implant. In some aspects, the retention member can be made of any suitable material, including, for example, PEEK.

Figure 17:
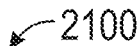
FIG. 17 illustrates a fixed hybrid dental attachment assembly, according to an embodiment.
Figure 17:
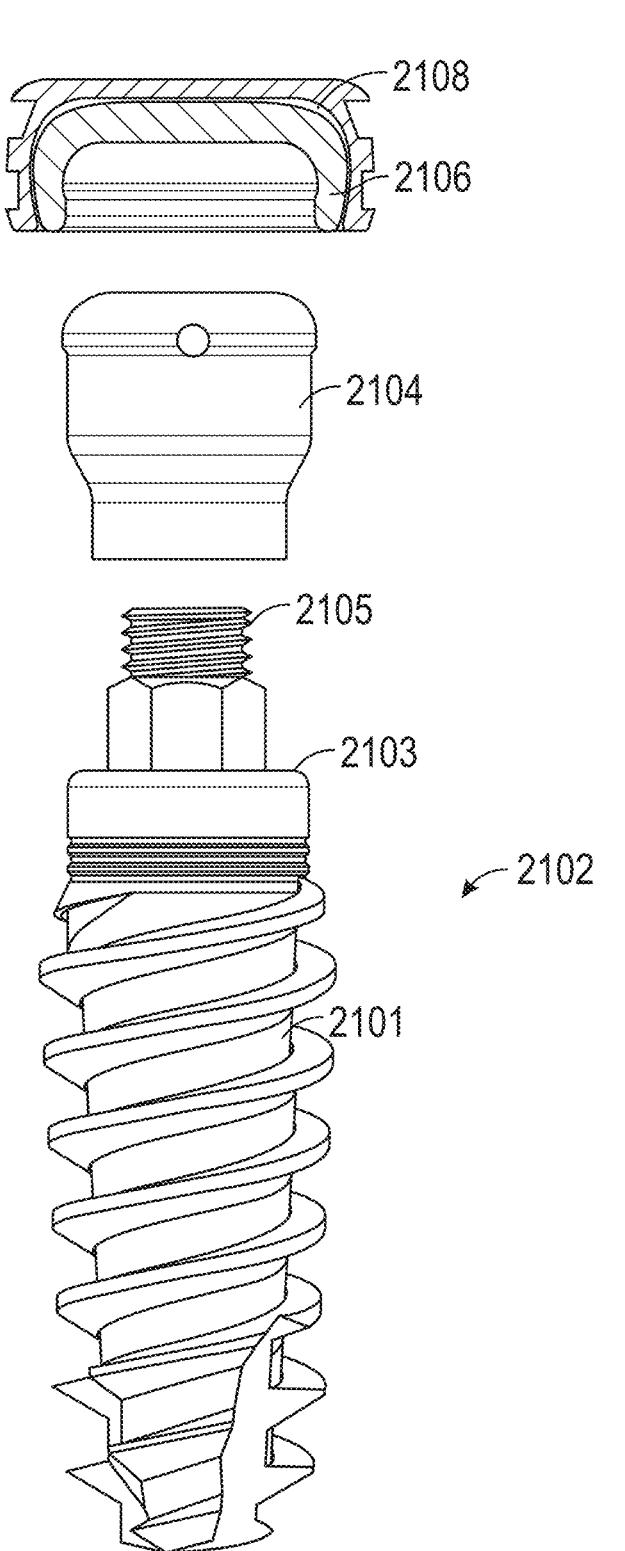

FIG. 17 illustrates a fixed hybrid dental attachment assembly 2100. Assembly 2100 comprises a cap 2108, retention member 2106, and abutment member 2104. Abutment member 2104 is configured for attachment to a tooth root, implant, or adjacent tooth. Retention member 2106 is provided for fixed, non-patient removable attachment to the abutment member. Cap 2108 is configured for securing in the recess in a dental appliance. The abutment member 2104 may have an upper end, and an outer locating surface portion being positioned to project above a tissue level when the abutment member is secured in a tooth root or implant. The abutment member 2104 may have a head portion at the upper end and a shaft depending downwardly from the head portion. The shaft may be at a predetermined angle to the head portion (e.g., 10 degrees, 20 degrees, 30 degrees, between 10-30 degrees) or aligned with the head portion. It is contemplated that abutment member 2104 can comprise any suitable abutment member, including any of the abutment members described in connection with other embodiments described herein. For example, in some embodiments the abutment member can comprise a first end shaped to attach to a tooth root, implant or adjacent tooth, and a second end with an outer locating surface, wherein the outer locating surface of the abutment member has at least two axially spaced retention portions comprising two generally rounded, annular projections or two annular grooves.

The retention member 2106 may have an upper end configured for engagement within a cap in a recess in a dental appliance, and a continuous, unbroken skirt projecting from the upper end of the retention member for engagement over the outer locating surface of the abutment member, the skirt having a rounded, convex outer surface, the retention member being constructed partially or entirely from a PEEK material or other rigid material such that it provides a retentive force of about 10 to 75 pounds, for example about 25-75 pounds or about 50-75 pounds. The abutment member 2104 and retention member 2106 may have mateable snap-engaging formations for releasable snap engagement when the retention member is attached to the abutment member. In some embodiments, the abutment member may have a socket projecting inwardly from the upper end of the abutment member and a retention head can project from the upper end of the retention member for releasable snap engagement in the socket. The retention head may have a lower end, with the skirt extending downwardly beyond the lower end of the retention head, whereby the skirt will contact the abutment member before the lower end of the retention head reaches the socket on re-insertion of the retention member into the abutment member. The abutment member may have a weep hole connecting the socket to the outside of the abutment member for allowing saliva to escape. As shown in FIG. 17, upper end of the retention member comprises an outer surface and an inner surface, and inner surface may lack a downwardly depending retention head (e.g., 28). The mateable snap-engaging formations may comprise an outwardly bulging portion of the outer locating surface portion of the abutment member and a corresponding concave ring portion of an inner surface of the skirt of the retention member. In some embodiments, the retention member may have at least two axially spaced, snap engaging formations on the inner surface of the skirt for releasable snap engagement with the respective retention portions of the abutment member. The axially spaced, snap engaging formations on the inner surface of the skirt may comprise two spaced, annular grooves for snap engagement over annular projections on the abutment member, or two annular projections for snap engagement with annular grooves on a corresponding abutment member.

The cap 2108 may comprise a cavity having a rounded concave inner surface for containing the upper end of the retention member. The concave inner surface of the cavity may allow for releasable snap engagement over the rounded outer surface of the skirt. In some aspects, the cap may comprise a generally cup shaped member having a central longitudinal axis, a top wall and an annular side wall extending away from the top wall, the top wall and side wall having an outer surface shaped to engage with the recess in the dental appliance. The cavity may be configured for swivel engagement or non-swivel engagement with the retention member, and the retention member may be adapted for swivel engagement or non-swivel engagement over the outer locating surface of the abutment member attached to the tooth root, implant, or adjacent tooth. In some contemplated embodiments, the top wall may have an interior top surface with a concave recess extending radially in an annular path along an outer annular peripheral portion of the interior top surface, the concave recess forming a curve having a first radius of curvature. The curve of the concave recess may continue along at least part of the inner surface of the side wall towards an open end of the rounded, concave inner surface of the cavity. The curve may be configured to provide swivel engagement with the retention member between a non-swiveled position in axial alignment with the central longitudinal axis of the retention member and a fully-swiveled position in which the central longitudinal axis of the cavity is at an angle to the central longitudinal axis of the retention member. The range of swivel of the cap over the retention member may be between 10-30 degrees, between 15-20 degrees, approximately 30 degrees, or at least 30 degrees. The concave recess may curve at a plurality of varying angles along the side wall and the interior top surface of the cavity. The concave recess may be composed of a series of consecutive tangent circular arcs, which can one or more of increase in size from the interior top surface to the bottom portion of the cap, and comprised of circles of increasing size from a top portion of the cap to a bottom portion of the cap. The concave recess can provide a retention member with an angle correction of up to, for example, approximately 30 degrees. The cap can have any suitable diameter and height, including for example, an outer diameter of approximately 5.4 mm, and a height of approximately 2.3 mm.

Assembly 2100 may also include implant 2102, and similarly to assembly 1700, the threaded post 2101 of the lower portion of implant 2102 can be configured to be straight, or at various angles as described above, such as between 15-32 degrees relative to straight, especially where the implant comprises an external projection extending from the top portion for releasable engagement with an abutment member. For example, implant 2102 can comprise an upper portion and a lower portion, the upper portion comprising threaded portion 2105 configured to screw into a threaded recess of an abutment, and wherein the lower portion comprises a platform 2103, which can be an angled platform, and a threaded post 2101 extending down from the platform, the threaded post configured for threaded engagement with bone or tissue in the mouth of the patient. The threaded post 2101 of implant 2102 can be configured to be straight as shown in FIG. 17, or at various angles such as between 10-30 degrees, between 5-35 degrees, between 15-30 degrees, between 10-35 degrees, 15 degrees, or 30 degrees, about 15 degrees (between 13.5-16.5 degrees), or about 30 degrees (between 27-33 degrees)—relative to a threaded post configured to extend straight down from the abutment as shown in FIG. 17. Viewed from another perspective, a line extending from a center portion of a platform 2103 to a center portion of the tip of the threaded post can align with and be positioned beneath a line extending from a central top portion of abutment 2104 to a central bottom of abutment 2104 (e.g., make a straight line), or a line extending from a center portion of platform 2103 to a center portion of the tip of the threaded post can form an angle (e.g., between 145-175 degrees, between 145-170 degrees, between 160-170 degrees, 165 degrees, between 145-155 degrees, 150 degrees) with a line extending from a central top portion of abutment 2104 to a central bottom of abutment 2104.

The lower portion of implant 2102 can comprise a platform 2103 and a threaded post 2101 extending from the platform for threaded engagement with a patient's bone or tissue. In some aspects, implant 2101 can comprise a lower portion that includes an angled platform. Threaded portion 2105 can be positioned above platform 2103 and screwed into the abutment (e.g., 2104), as shown in FIG. 17. In the straight embodiment of FIG. 17, the platform is orthogonal or about (e.g., within 10% of) orthogonal to the length of the threaded post (from a center of platform 2193 to a center of the tip of the threaded post). In some contemplated embodiments, the platform 2103 can be angled relative to a line that is orthogonal to the length of the threaded post, for example, about 15 degrees, about 20 degrees, about 30 degrees, between 5-35 degrees, between 10-35 degrees, between 10-30 degrees, or between 15-30 degrees, or at any other suitable angle(s) relative to a line that is orthogonal to the length of the threaded post. The angled platform can advantageously allow for the threaded post 2101 of implant 2102 to be angled while threaded portion (e.g., 2105) extends substantially straight up. Viewed from another perspective, the angled platform can advantageously allow for the threaded post of implant 2102 to be angled relative to the threaded portion 2105, for example, forming an angle of between 145-175 degrees, between 145-170 degrees, between 160-170 degrees, 165 degrees, between 145-155 degrees, or 150 degrees. In some embodiments, the threaded post comprises opposing axial cuts adapted for self-tapping into the patient's bone or tissue. In some embodiments, the dental implant has a maximum outside diameter between about 1.5 mm and about 4.0 mm. In some embodiments, the threaded post comprises two successive threads of different pitch. In some embodiments, the annular cuff portion may be of different heights to accommodate different tissue depths. In some embodiments, the external projection can include a tool-receiving bore extending inwardly from an upper end of the projection.

According to another aspect, contemplated implants can comprise a) an endosseous dental implant comprising: (i) a first end portion having a top and a bottom, the first end portion comprises: (1) an external projection extending from the top of the first end portion for releasable engagement with an abutment member, wherein the abutment member has an external lower bevel portion; and (2) an annular cuff portion defining an annular seat having a recessed, inwardly tapered bevel surface, wherein the tapered bevel surface surrounds the external projection; and wherein the lower bevel of the abutment member contacts and seats on tapered bevel surface of the annular seat to form a line of connection when the abutment member is releasably engaged with the external projection, wherein the line of connection is located slightly below a patient's gum line when the implant is secured in the mouth of the patient; and (ii) a threaded post which extends from the bottom of the first end portion for direct engagement into the patient's bone or tissue. It is contemplated that the threaded post can be straight, or can be angled relative to at least one of the first end portion and the abutment member. For example, the threaded post can be angled between 10-20 degrees, about 15 degrees, between 25-35 degrees, or about 30 degrees relative to at least one of the first end portion and the abutment member. In some embodiments, the threaded post comprises a single lead thread or multiple lead threads. In some embodiments, the threaded post comprises opposing axial cuts adapted for self-tapping into the patient's bone or tissue. In some embodiments, the dental implant has a maximum outside diameter between about 1.5 mm and about 4.0 mm. In some embodiments, the threaded post comprises two successive threads of different pitch. In some embodiments, the annular cuff portion may be of different heights to accommodate different tissue depths. In some embodiments, the external projection can include a tool-receiving bore extending inwardly from an upper end of the projection.

However, it should be appreciated that assembly 2100 or a component/components thereof (e.g., cap 2108, retention member 2106) can be used in connection with any of the components of any of the assemblies and dental appliances described herein.

In some aspects, a dental assembly can comprise a dental appliance and any suitable number of attachment assemblies (e.g., 1, 2, 3, 4, 5). The dental appliance may have at least as many recesses as the number of attachment assemblies included in the dental assembly. Each attachment assembly may comprise a cap, a retention member, and an abutment. Each attachment assembly can optionally comprise an implant. The attachment assemblies of the dental assembly can comprise the same or different attachment assemblies. For example, the attachment assemblies can comprise one or more of any combination of dental assemblies described herein, including the dental assemblies described and shown in FIGS. 1-5, 6-10, 11A-G, 13, 14A-C, and 17, with the retention member of at least one of the attachment assemblies having a first end and a continuous, unbroken skirt extending from the first end defining an inner surface for engagement over the outer locating surface of the first abutment member, the retention member being constructed from a rigid material (e.g., PEEK) such that it provides a retentive force of about 10 to 75 pounds.

Non-Limiting Embodiments

Embodiment 1. A dental assembly for a mouth of a patient, comprising: an implant comprising an upper portion and a lower portion; wherein the upper portion comprises a threaded portion configured to screw into a threaded recess of an abutment; and wherein the lower portion comprises an angled platform and a threaded post extending from the angled platform, the threaded post configured for threaded engagement with bone or tissue in the mouth of the patient, wherein the angled platform is angled relative to a line that is orthogonal to a length of the threaded post.

Embodiment 2. The dental assembly of embodiment 1, further comprising a retention member having a first end and a continuous, unbroken skirt extending from the first end defining an inner surface for engagement over an outer locating surface of the abutment.

Embodiment 3. The dental assembly of embodiment 1 or embodiment 2, wherein the retention member is constructed from a rigid polyetheretherketone (PEEK) material such that it provides a retentive force of about 10 to 75 pounds.

Embodiment 4. The dental assembly of embodiment 1, embodiment 2 or embodiment 3, further comprising a cap configured for securing in a dental appliance and engaging the retention member.

Embodiment 5. The dental assembly of any of embodiments 1-4, wherein the threaded post is angled relative to the threaded portion of the upper portion.

Embodiment 6. The dental assembly of any of embodiments 1-5, wherein the threaded post is angled about 15 degrees relative to the threaded portion of the upper portion.

Embodiment 7. The dental assembly of any of embodiments 1-5, wherein the threaded post is angled about 30 degrees relative to the threaded portion of the upper portion.

Embodiment 8. The dental assembly of any of embodiments 1-5, wherein the threaded post is angled about 20 degrees relative to the threaded portion of the upper portion.

Embodiment 9. The dental assembly of any of embodiments 1-5, wherein the angled platform is angled between 10-35 degrees relative to the line that is orthogonal to the length of the threaded post.

Embodiment 10. The dental assembly of embodiment 1, wherein the threaded post comprises a single lead thread or multiple lead threads.

Embodiment 11. The dental assembly of embodiment 1, wherein the threaded post comprises opposing axial cuts adapted for self-tapping into the bone or tissue.

Embodiment 12. The dental assembly of embodiment 9, wherein the threaded post comprises a single lead thread or multiple lead threads.

Embodiment 13. The dental assembly of embodiment 9, wherein the threaded post comprises opposing axial cuts adapted for self-tapping into the bone or tissue.

Embodiment 14. The dental assembly of embodiment 1, wherein the implant has a maximum outside diameter between about 1.5 mm and about 4.0 mm.

Embodiment 15. The dental assembly of embodiment 9, wherein the implant has a maximum outside diameter between about 1.5 mm and about 4.0 mm.

Embodiment 16. The dental assembly of embodiment 6, wherein the threaded post comprises a single lead thread or multiple lead threads.

Embodiment 17. The dental assembly of embodiment 7, wherein the threaded post comprises a single lead thread or multiple lead threads.

Embodiment 18. The dental assembly of embodiment 6, wherein the threaded post comprises opposing axial cuts adapted for self-tapping into the bone or tissue.

Embodiment 19. The dental assembly of embodiment 7, wherein the threaded post comprises opposing axial cuts adapted for self-tapping into the bone or tissue.

Embodiment 20. The dental assembly of embodiment 6, wherein the implant has a maximum outside diameter between about 1.5 mm and about 4.0 mm.

Embodiment 21. The dental assembly of embodiment 7, wherein the implant has a maximum outside diameter between about 1.5 mm and about 4.0 mm.

Embodiment 22. A dental attachment assembly, comprising: an abutment member for attachment to a tooth root, implant, or adjacent tooth, the abutment member having an upper end, and an outer locating surface portion projecting downwardly from the upper end, the outer locating surface portion being positioned to project above a tissue level when the abutment member is secured in a tooth root, implant, or adjacent tooth; a retention member for fixed, non-patient removable, attachment to the abutment member, the retention member having an upper end comprising a swivel joint for swivel engagement within a cap in a recess in a dental appliance, and a continuous, unbroken skirt projecting from the upper end of the retention member for engagement over the outer locating surface of the abutment member, the skirt having a rounded, convex outer surface, the retention member being constructed from a rigid material such that it provides a retentive force of about 10 to 75 pounds; the abutment member and retention member having mateable snap-engaging formations for releasable snap engagement when the retention member is attached to the abutment member; and a cap for securing in a recess in a dental appliance, the cap having a cavity for containing said swivel joint, the cavity having a rounded, concave inner surface for releasable snap engagement over the rounded outer surface of the skirt, the swivel joint and cap cavity together comprising means for permitting swivelling of the cap over the retention member relative to the dental appliance.

Embodiment 23. The dental attachment assembly of embodiment 22, wherein the outer locating surface portion is outwardly tapered at least adjacent the upper end of the abutment member for centering the retention member over the abutment member as the members are secured together.

Embodiment 24. The dental attachment assembly of embodiment 22, wherein the rigid material is PEEK.

Embodiment 25. The dental attachment assembly of embodiment 22, wherein the abutment member has a socket projecting inwardly from the upper end, of the abutment member and a retention head projects from the upper end of the retention member for releasable snap engagement in the socket.

Embodiment 26. The dental attachment assembly of embodiment 25, wherein the retention head has a lower end, and the skirt extends downwardly beyond the lower end of the retention head, whereby the skirt will contact the abutment member before the lower end of the retention head reaches the socket on re-insertion of the retention member into the abutment member.

Embodiment 27. The dental attachment assembly of embodiment 25, wherein the retention head does not project downwardly beyond the lower end of the skirt, whereby the lower end of the skirt contacts the abutment member prior to any other part of the attachment assembly.

Embodiment 28. The dental attachment assembly of embodiment 25, wherein the abutment member has a weep hole connecting the socket to the outside of the abutment member for allowing saliva the escape.

Embodiment 29. The dental attachment assembly of embodiment 22, wherein the outer locating surface portion has an outward taper from said upper end and terminates at a predetermined location above the tissue level when the abutment member is secured in a patient's mouth.

Embodiment 30. The dental attachment assembly of embodiment 22, wherein the abutment member comprises a generally cylindrical head having a lower end spaced below said upper end.

Embodiment 31. The dental attachment assembly of embodiment 22, wherein the skirt has an inner surface of predetermined height which is concave and does not contact the outer locating surface portion of the abutment member along at least a major portion of the height of the inner surface when the male and abutment members are secured together.

Embodiment 32. The dental attachment assembly of embodiment 22, wherein the outer locating surface portion of the abutment member has a pair of diametrically opposed elongated notches for engagement with an insertion tool for engaging the abutment member with an implant Embodiment 33. The dental attachment assembly of embodiment 22, wherein the abutment member comprises means for attachment to a non-hexed implant, and the abutment member has a minimum height of 1.75 mm.

Embodiment 34. The dental attachment assembly of embodiment 22, wherein the abutment member comprises means for attachment to a hexed implant, and the abutment member has a minimum height of 2.75 mm.

Embodiment 35. The dental attachment assembly of embodiment 22, wherein the abutment member comprises a generally cylindrical head 40 having a convex outer surface portion adjacent said upper end, and the retention member is generally cup-shaped with an internal cavity for fitting over said head, the skirt having a concave inner surface portion for snap engagement over said convex outer surface portion to releasably secure the members together, said convex and concave surface portions comprising said mateable snap engaging formations.

Embodiment 36. The dental attachment assembly of embodiment 22, wherein the abutment member has a head portion at the upper end and a shaft depending downwardly from the head portion.

Embodiment 37. The dental attachment assembly of embodiment 36, wherein the shaft is at a predetermined angle to the head portion.

Embodiment 38. The dental attachment assembly of embodiment 37, including a plurality of abutment members for selective engagement with a tooth root or implant, including a first abutment member having a shaft aligned with said head portion, a second, angled abutment member having a shaft at an angle of 10° to said head portion, and a third, angled abutment member having a shaft at an angle of 20° to said head portion.

Embodiment 39. The dental attachment assembly of embodiment 38, wherein the outer locating surface portion of said head portion is convex.

Embodiment 40. The dental attachment assembly of embodiment 38, wherein said abutment member has a through bore extending from the upper end to said lower end, and the retention member has a retention head projecting from its upper end for releasable snap engagement in said through bore.

Embodiment 41. The dental attachment assembly of embodiment 40, wherein said skirt has a lower end extending beyond said retention head for contacting said abutment member before said retention head reaches the upper end of said abutment member.

Embodiment 42. The dental attachment assembly of embodiment 41, wherein said skirt and said outer locating surface portion together comprise alignment means for aligning said retention head with said through bore as the male and abutment members are secured together.

Embodiment 43. The dental attachment assembly of embodiment 22, wherein the cap comprises a generally cup shaped member having a central longitudinal axis, a top wall and an annular side wall extending away from the top wall, the top wall and side wall having an outer surface shaped to engage with a recess in a dental appliance and a rounded, concave inner surface defining a cavity configured for swivel engagement with a retention member adapted for non-swivel engagement over an outer locating surface of an abutment member attached to a tooth root, implant, or adjacent tooth and having a central longitudinal axis; the top wall having an interior top surface with a concave recess extending radially in an annular path along an outer annular peripheral portion of the interior top surface, the concave recess forming a curve having a first radius of curvature; and the curve of the concave recess continuing along at least part of the inner surface of the side wall towards an open end of the rounded, concave inner surface of the cavity; and wherein the curve is configured to provide swivel engagement with the retention member between a non-swiveled position in axial alignment with the central longitudinal axis of the retention member and a fully-swiveled position in which the central longitudinal axis of the cavity is at an angle to the central longitudinal axis of the retention member.

Embodiment 44. The dental attachment assembly of embodiment 43, further comprising a central portion of the top surface which protrudes vertically into the cavity, the protruding central portion adapted to contact a central portion of an opposing surface of the retention member in the non-swiveled position.

Embodiment 45. The dental attachment assembly of embodiment 43, wherein the curve of the concave recess and inner surface of the side wall of the cavity comprise a plurality of consecutive tangent circular arcs having different radii of curvature along the length of the curve from the top wall along the side wall.

Embodiment 46. The dental attachment assembly of embodiment 45, wherein the radii of curvature of the series of consecutive tangent circular arcs increase in size from the interior top surface towards an open end of the rounded, concave inner surface of the cavity.

Embodiment 47. The dental attachment assembly of embodiment 46, wherein the radii of curvature of the series of consecutive tangent circular arcs increase in size from the interior top surface to the open end of the rounded, concave inner surface of the cavity.

Embodiment 48. The dental attachment assembly of embodiment 47, wherein there are three consecutive tangent circular arcs along the curve of the concave inner surface of the cavity.

Embodiment 49. The dental attachment assembly of embodiment 48, wherein the consecutive tangent circular arcs have radii of 0.034, 0.042 and 0.093 inches, respectively.

Embodiment 50. The dental attachment assembly of embodiment 43, wherein an outer diameter of the cap is approximately 5.4 millimeters (mm) and a height of the cap is approximately 2.3 mm.

Embodiment 51. The dental attachment assembly of embodiment 43, wherein the swivel engagement of the concave recess of the cap with respect to the retention member between the non-swiveled and fully-swiveled position is up to approximately 30 degrees.

Embodiment 52. The dental attachment assembly of embodiment 43, wherein the concave recess in the interior top surface of the cap is adapted to provide a space between the interior top surface and an opposing first end of the retention member in the non-swiveled position and to engage an opposing outer surface portion of the retention member in the fully-swiveled position.

Embodiment 53. A dental attachment assembly, comprising: an abutment member for attachment to a tooth root, implant, or adjacent tooth, the abutment member having an upper end, and an outer locating surface portion projecting downwardly from the upper end, the outer locating surface portion being positioned to project above a tissue level when the abutment member is secured in a tooth root, implant, or adjacent tooth; a retention member for fixed, non-patient removable, attachment to the abutment member, the retention member having an upper end configured for engagement within a cap in a recess in a dental appliance, and a continuous, unbroken skirt projecting from the upper end of the retention member for engagement over the outer locating surface of the abutment member, the skirt having a rounded, convex outer surface, the retention member being constructed from a PEEK material such that it provides a retentive force of about 10 to 75 pounds; the abutment member and retention member having mateable snap-engaging formations for releasable snap engagement when the retention member is attached to the abutment member; and wherein the cap is configured for securing in the recess in the dental appliance, and comprises a cavity for containing said upper end of the retention member, the cavity having a rounded, concave inner surface for releasable snap engagement over the rounded outer surface of the skirt.

Embodiment 54. The dental attachment assembly of embodiment 53, wherein the abutment member comprises a head portion at the upper end, and a shaft depending downwardly from the head portion, and wherein the shaft is at a predetermined angle to the head portion that is not aligned with the head portion.

Embodiment 55. The dental attachment assembly of embodiment 53, wherein the abutment member has a socket projecting inwardly from the upper end, of the abutment member and a retention head projects from the upper end of the retention member for releasable snap engagement in the socket.

Embodiment 56. The dental attachment assembly of embodiment 55, wherein the retention head has a lower end, and the skirt extends downwardly beyond the lower end of the retention head, whereby the skirt will contact the abutment member before the lower end of the retention head reaches the socket on re-insertion of the retention member into the abutment member.

Embodiment 57. The dental attachment assembly of embodiment 55, wherein the retention head does not project downwardly beyond the lower end of the skirt, whereby the lower end of the skirt contacts the abutment member prior to any other part of the attachment assembly.

Embodiment 58. The dental attachment assembly of embodiment 53, wherein the abutment member has a weep hole connecting a socket projecting inwardly from an upper end of the abutment member to the outside of the abutment member for allowing saliva to escape.

Embodiment 59. The dental attachment assembly of embodiment 53, wherein the mateable snap-engaging formations comprises an outwardly bulging portion of the outer locating surface portion of the abutment member and a corresponding concave ring portion of an inner surface of the skirt of the retention member.

Embodiment 60. The dental attachment assembly of embodiment 53, wherein the abutment member comprises a generally cylindrical head having a convex outer surface portion adjacent said upper end, and the retention member is generally cup-shaped with an internal cavity for fitting over said head, the skirt having a concave inner surface portion for snap engagement over said convex outer surface portion to releasably secure the members together, said convex and concave surface portions comprising said mateable snap engaging formations.

Embodiment 61. The dental attachment assembly of embodiment 54, further comprising a second abutment member and a third abutment member, wherein the abutment member has a shaft aligned with said head portion, wherein the second abutment member has a shaft at an angle of 10° to said head portion, and wherein the third abutment member has a shaft at an angle of 20° to said head portion.

Embodiment 62. The dental attachment assembly of embodiment 54, wherein the head portion comprises the outer locating surface portion, and wherein the outer locating surface portion is convex.

Embodiment 63. The dental attachment assembly of embodiment 53, wherein the cap comprises a generally cup shaped member having a central longitudinal axis, a top wall and an annular side wall extending away from the top wall, the top wall and side wall having an outer surface shaped to engage with the recess in the dental appliance, and wherein the cavity is configured for swivel engagement with the retention member adapted for non-swivel engagement over the outer locating surface of the abutment member attached to the tooth root, implant, or adjacent tooth; the top wall having an interior top surface with a concave recess extending radially in an annular path along an outer annular peripheral portion of the interior top surface, the concave recess forming a curve having a first radius of curvature; the curve of the concave recess continuing along at least part of the inner surface of the side wall towards an open end of the rounded, concave inner surface of the cavity; and wherein the curve is configured to provide swivel engagement with the retention member between a non-swiveled position in axial alignment with the central longitudinal axis of the retention member and a fully-swiveled position in which the central longitudinal axis of the cavity is at an angle to the central longitudinal axis of the retention member Embodiment 64. The dental attachment assembly of embodiment 53, wherein the upper end of the retention member comprises a swivel joint, and wherein the swivel joint and cap cavity together permit a swivelling of the cap over the retention member.

Embodiment 65. The dental attachment assembly of embodiment 64, wherein a range of swivel of the cap over the retention member is between 15-20 degrees.

Embodiment 66. The dental attachment assembly of embodiment 64, wherein a range of swivel of the cap over the retention member is approximately 30 degrees.

Embodiment 67. A dental attachment assembly, comprising: an abutment member with a first end shaped to attach to a tooth root, implant or adjacent tooth, and a second end with an outer locating surface, wherein the outer locating surface of the abutment member has at least two axially spaced retention portions comprising two generally rounded, annular projections; a retention member having a first end and a continuous, unbroken skirt extending from the first end defining an inner surface for engagement over the outer locating surface of the abutment member, the retention member being constructed from a rigid material such that it provides a retentive force of about 10 to 75 pounds, wherein the retention member has at least two axially spaced, snap engaging formations on the inner surface of the skirt for releasable snap engagement with the respective retention portions of the abutment member, and wherein the axially spaced, snap engaging formations on the inner surface of the skirt comprise two spaced, annular grooves for snap engagement over the annular projections on the abutment member; and a cap with a rounded, concave inner surface defining a cavity to receive the retention member; wherein the cap is configured for securing in a dental appliance.

Embodiment 68. The dental attachment assembly of embodiment 67, wherein the rigid material is PEEK.

Embodiment 69. The dental attachment assembly of embodiment 67, wherein an interior top surface of the cavity includes a concave recess extending radially along an outer periphery of the interior top surface of the cavity.

Embodiment 70. The dental attachment assembly of embodiment 69, further comprising a central portion of the interior top surface which protrudes vertically into the cavity.

Embodiment 71. The dental attachment assembly of embodiment 70, wherein the retention member is in direct contact with the central portion of the interior top surface.

Embodiment 72. The dental attachment assembly of embodiment 68, wherein a curve of the concave recess continues along a side wall of the rounded, concave inner surface defining the cavity.

Embodiment 73. The dental attachment assembly of embodiment 72, wherein the concave recess curves at a plurality of varying angles along the side wall and the interior top surface of the cavity.

Embodiment 74. The dental attachment assembly of embodiment 72, wherein the concave recess is composed of a series of consecutive tangent circular arcs.

Embodiment 75. The dental attachment assembly of embodiment 74, wherein the series of consecutive tangent circular arcs increase in size from the interior top surface to the bottom portion of the cap.

Embodiment 76. The dental attachment assembly of embodiment 73, wherein the series of consecutive tangent circular arcs are comprised of circles of increasing size from a top portion of the cap to a bottom portion of the cap.

Embodiment 77. The dental attachment assembly of embodiment 67, wherein an outer diameter of the cap is approximately 5.4 millimeters (mm) and a height of the cap is approximately 2.3 mm.

Embodiment 78. The dental attachment assembly of embodiment 68, wherein the concave recess provides a retention member with an angle correction of up to approximately 30 degrees.

Embodiment 79. A dental assembly, comprising: (a) an endosseous dental implant comprising: (i) a first end portion having a top and a bottom, the first end portion comprises: (1) an external projection extending from the top of the first end portion for releasable engagement with an abutment member, wherein the abutment member has a lower portion; and (2) an annular cuff portion defining an annular seat; and wherein the lower portion of the abutment member contacts and seats on the annular seat to form a line of connection when the abutment member is releasably engaged with the external projection, wherein the line of connection is located slightly below a patient's gum line when the implant is secured in the mouth of the patient; and (ii) a threaded post which extends from the bottom of the first end portion for direct engagement into the patient's bone or tissue; (b) a retention member having a first end and a continuous, unbroken skirt extending from the first end defining an inner surface for fixed, non-patient removable, engagement over an outer locating surface of the abutment member, the retention member being constructed from a rigid material such that it provides a retentive force of between 10 to 75 pounds, wherein the rigid material comprises PEEK; and (c) a cap configured for securing in a dental appliance and engaging the retention member.

Embodiment 80. A dental assembly, comprising: (a) an endosseous dental implant comprising: (i) a first end portion having a top and a bottom, the first end portion comprises: (1) an external projection extending from the top of the first end portion for releasable engagement with an abutment member, wherein the abutment member has an external lower portion; and (2) an annular cuff portion defining an annular seat having a recessed, inwardly tapered bevel surface, wherein the tapered bevel surface surrounds the external projection; and wherein the lower bevel of the abutment member contacts and seats on tapered bevel surface of the annular seat to form a line of connection when the abutment member is releasably engaged with the external projection, wherein the line of connection is located slightly below a patient's gum line when the implant is secured in the mouth of the patient; and (ii) a threaded post which extends from the bottom of the first end portion for direct engagement into the patient's bone or tissue; (b) a retention member having a first end and a continuous, unbroken skirt extending from the first end defining an inner surface for engagement over the outer locating surface of the abutment member, the retention member being constructed from a rigid material such that it provides a retentive force of about 10 to 75 pounds; and (c) a cap configured for securing in a dental appliance and engaging the retention member.

Embodiment 81. The dental assembly of embodiment 79 or embodiment 80, wherein the threaded post is angled relative to at least one of the external projection, the first end portion, and the abutment member.

Embodiment 82. The dental assembly of embodiment 81, wherein the threaded post is angled between 10-20 degrees relative to the at least one of the first end portion and the abutment member.

Embodiment 83. The dental assembly of embodiment 82, wherein the threaded post is angled about 15 degrees relative to the at least one of the first end portion and the abutment member.

Embodiment 84. The dental assembly of embodiment 81, wherein the threaded post is angled between 25-35 degrees relative to the at least one of the first end portion and the abutment member.

Embodiment 85. The dental assembly of embodiment 84, wherein the threaded post is angled about 30 degrees relative to the at least one of the first end portion and the abutment member.

Embodiment 86. The dental assembly of embodiment 79 or embodiment 80, wherein the rigid material is polyetheretherketone (PEEK).

Embodiment 87. The dental assembly of embodiment 79 or embodiment 80, wherein the threaded post comprises a single lead thread or multiple lead threads.

Embodiment 88. The dental assembly of embodiment 79 or embodiment 80, wherein the threaded post comprises opposing axial cuts adapted for self-tapping into the patient's bone or tissue.

Embodiment 89. The dental assembly of embodiment 79 or embodiment 80, wherein the dental implant has a maximum outside diameter between about 1.5 mm and about 4.0 mm.

Embodiment 90. The dental assembly of embodiment 79 or embodiment 80, wherein the threaded post comprises two successive threads of different pitch.

Embodiment 91. The dental assembly of embodiment 79 or embodiment 80, wherein the annular cuff portion may be of different heights to accommodate different tissue depths.

Embodiment 92. The dental assembly of embodiment 79 or embodiment 80, wherein the external projection has a tool-receiving bore extending inwardly from an upper end of the projection.

Embodiment 93. A dental assembly, comprising: a dental appliance comprising a first recess and a second recess; a first cap for securing in the first recess and a second cap for securing in the second recess; a first abutment member for attaching to a first tooth root, implant, or adjacent tooth, and a second abutment member for attaching to a second tooth root, implant, or adjacent tooth; a first retention member sized for engagement within the first cap, the first retention member having a first end and a continuous, unbroken skirt extending from the first end defining an inner surface for engagement over the outer locating surface of the first abutment member, the retention member being constructed from a rigid material such that it provides a retentive force of about 10 to 75 pounds; and a second retention member sized for engagement within the second cap, the second retention member having a first end and a continuous, unbroken skirt extending from the first end defining an inner surface for engagement over the outer locating surface of the second abutment member, the retention member being constructed from a rigid material such that it provides a retentive force of about 10 to 75 pounds.

Embodiment 94. The dental assembly of embodiment 93, wherein the first abutment member comprises an upper end, and the outer locating surface of the first abutment member is positioned to project about a tissue level when the abutment member is secured in the first tooth root, implant, or adjacent tooth, wherein the first retention member comprises an upper end comprising a swivel joint for swivel engagement within the first cap, wherein the first abutment member and first retention member have mateable snap-engaging formations for releasable snap engagement when the first retention member is attached to the first abutment member; and wherein the first cap comprises a cavity for containing the swivel joint, the cavity having a rounded, concave inner surface for releasable snap engagement over the rounded outer surface of the skirt, the swivel joint and cap cavity together comprising means for permitting swivelling of the first cap over the first retention member relative to the dental appliance.

Embodiment 95. The dental assembly of embodiment 94, wherein the outer locating surface of the first abutment member is outwardly tapered at least adjacent the upper end of the first abutment member for centering the first retention member over the first abutment member as they are secured together Embodiment 96. The dental assembly of embodiment 93, wherein the first abutment member comprises a first end shaped to attach to the first tooth root, implant or adjacent tooth, and a second end with the first outer locating surface, wherein the first outer locating surface of the first abutment member has at least two axially spaced retention portions comprising two generally rounded, annular projections, wherein the first retention member has at least two axially spaced, snap engaging formations on the inner surface of the skirt for releasable snap engagement with the respective retention portions of the abutment member, and wherein the axially spaced, snap engaging formations on the inner surface of the skirt comprise two spaced, annular grooves for snap engagement over the annular projections on the first abutment member, and wherein the first cap comprises a rounded, concave inner surface defining a cavity to receive a swivel engagement with the first retention member; wherein an interior top surface of the cavity includes a concave recess extending radially along an outer periphery of the interior top surface of the cavity.

Embodiment 97. The dental assembly of embodiment 93, further comprising: an implant comprising an upper portion and a lower portion; wherein the upper portion comprises a threaded portion configured to screw into a threaded recess of the first abutment member; and wherein the lower portion comprises an angled platform and a threaded post extending from the angled platform, the threaded post configured for threaded engagement with bone or tissue in the mouth of the patient, wherein the angled platform is angled relative to a line that is orthogonal to a length of the threaded post.

Embodiment 98. The dental assembly of embodiment 93, wherein the rigid material is PEEK.

Embodiment 99. The dental assembly of embodiment 94 or embodiment 95, wherein the first abutment member has a socket projecting inwardly from the upper end of the abutment member and a retention head projects from the upper end of the first retention member for releasable snap engagement in the socket.

Embodiment 100. The dental assembly of embodiment 94 or embodiment 95, wherein the outer locating surface has an outward taper from the upper end of the first abutment member and terminates at a predetermined location above the tissue level when the first abutment member is secured in a patient's mouth.

Embodiment 101. The dental assembly of embodiment 94 or embodiment 95, wherein the first abutment member comprises a generally cylindrical head having a lower end spaced below the upper end of the first abutment member.

Embodiment 102. The dental assembly of embodiment 94 or embodiment 95, wherein the skirt of the first retention member has an inner surface of predetermined height which is concave and does not contact the outer locating surface portion of the first abutment member along at least a major portion of the height of the inner surface when the first retention member and first abutment members are secured together.

Embodiment 103. The dental assembly of embodiment 94 or embodiment 95, wherein the first cap comprises a generally cup shaped member having a central longitudinal axis, a top wall and an annular side wall extending away from the top wall, the top wall and side wall having an outer surface shaped to engage with the first recess in the dental appliance.

Embodiment 104. The dental assembly of embodiment 93, wherein the first abutment member comprises a first end shaped to attach to the first tooth root, implant or adjacent tooth, and a second end with the first outer locating surface, wherein the first outer locating surface of the first abutment member has at least two axially spaced retention portions comprising two generally rounded, annular projections, wherein the first retention member has at least two axially spaced, snap engaging formations on the inner surface of the skirt for releasable snap engagement with the respective retention portions of the abutment member, and wherein the axially spaced, snap engaging formations on the inner surface of the skirt comprise two spaced, annular grooves for snap engagement over the annular projections on the first abutment member, and wherein the first cap comprises a rounded, concave inner surface defining a cavity to receive a swivel engagement with the first retention member; wherein an interior top surface of the cavity includes a concave recess extending radially along an outer periphery of the interior top surface of the cavity.

Embodiment 105. The dental assembly of embodiment 104, further comprising a central portion of the interior top surface which protrudes vertically into the cavity.

Embodiment 106. The dental assembly of embodiment 105, wherein the first retention member is in direct contact with the central portion of the interior top surface.

Embodiment 107. The dental assembly of embodiment 104, wherein a curve of the concave recess continues along a side wall of the rounded, concave inner surface defining the cavity.

Embodiment 108. The dental assembly of embodiment 107, wherein the concave recess curves at a plurality of varying angles along the side wall and the interior top surface of the cavity.

Embodiment 109. The dental assembly of embodiment 108, wherein the concave recess is composed of a series of consecutive tangent circular arcs.

Embodiment 110. The dental assembly of embodiment 93, further comprising an endosseous dental implant, comprising: (i) a first end portion having a top and a bottom, the first end portion comprises: (1) an external projection extending from the top of the first end portion for releasable engagement with the first abutment member, wherein the first abutment member has an external lower bevel portion; and (2) an annular cuff portion defining an annular seat having a recessed, inwardly tapered bevel surface, wherein the tapered bevel surface surrounds the external projection; and wherein the lower bevel of the first abutment member contacts and seats on tapered bevel surface of the annular seat to form a line of connection when the abutment member is releasably engaged with the external projection, wherein the line of connection is located slightly below a patient's gum line when the implant is secured in the mouth of the patient; and (ii) a threaded post which extends from the bottom of the first end portion for direct engagement into the patient's bone or tissue.

Embodiment 111. The dental assembly of embodiment 110, wherein the threaded post is angled relative to at least one of the first end portion and the first abutment member.

Embodiment 112. The dental assembly of embodiment 111, wherein the threaded post is angled between 10-20 degrees relative to the at least one of the first end portion and the abutment member.

Embodiment 113. The dental assembly of embodiment 112, wherein the threaded post is angled about 15 degrees relative to the at least one of the first end portion and the abutment member.

Embodiment 114. The dental assembly of embodiment 111, wherein the threaded post is angled between 25-35 degrees relative to the at least one of the first end portion and the abutment member.

Embodiment 115. The dental assembly of embodiment 114, wherein the threaded post is angled about 30 degrees relative to the at least one of the first end portion and the abutment member.

Embodiment 116. The dental assembly of embodiment 93, wherein the rigid material is polyetheretherketone (PEEK).

Thus, specific examples of dental attachment assemblies have been disclosed. The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of dental attachment assembly for anchoring a dental appliance with a base structure such as a tooth root or dental implant. Hence, although the present embodiments are, for convenience of explanation, depicted and described as being implemented in a dental attachment assembly for anchoring a dental appliance with a base structure such as a tooth root or dental implant, it will be appreciated that it can be implemented in various other types of dental attachment assembly for anchoring a dental appliance with a base structure such as a tooth root or dental implant. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As used herein and in the appended claims, the singular forms "a," "an," and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation.

Reference throughout this specification to "an embodiment" or "an implementation" means that a particular feature, structure, or characteristic described in connection with the embodiment is included in at least one embodiment or implementation. Thus, appearances of the phrases "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Certain numerical values and ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

All structural and functional equivalents to the components of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A dental assembly convertible between a patient-removable state and a non-patient-removable state by interchanging retention members, the dental assembly comprising:

an implant comprising an upper portion and a lower portion;

an abutment configured to couple to the implant, the abutment comprising a threaded recess, wherein the upper portion comprises a threaded portion configured to screw into the threaded recess of the abutment, wherein the lower portion comprises an angled platform and a threaded post extending from the angled platform, the threaded post configured to engage with bone or tissue in the mouth of the patient based on a thread of the threaded post, wherein the angled platform is angled relative to a line that is orthogonal to a length of the threaded post from a center of the angled platform to a tip of the threaded post;

a non-patient-removable retention member having a first end and an unbroken skirt extending from the first end defining an inner surface engagement portion configured to engage with the abutment over an outer locating surface of the abutment to form a non-patient removable attachment to the abutment based on a retentive force of 10 to 75 pounds to convert the dental assembly to a non-patient-removable state, wherein the non-patient-removable retention member comprises a rigid material configured to provide the retentive force of between 10 to 75 pounds when the non-patient-removable attachment forms to convert the dental assembly to the non-patient-removable state; and a cap configured for securing in a dental appliance and engaging the non-patient-removable retention member, wherein the abutment is configured to engage with a patient-removable replacement retention member to form a patient-removable attachment to the patient-removable replacement retention member to convert the dental assembly to a patient-removable state based on a retentive force of less than 10 pounds, wherein the patient-removable replacement retention member comprises a resilient material more resilient than the rigid material to provide the retentive force of less than 10 pounds when the patient-removable attachment forms to convert the dental assembly to the patient-removable state, wherein the patient-removable replacement retention member comprises a second end and a second unbroken skirt extending from the second end defining a second inner surface for patient removable engagement over the outer locating surface of the abutment, in place of the non-patient-removable retention member.

2. The dental assembly of claim 1, wherein the threaded post is angled relative to the threaded portion of the upper portion.

3. The dental assembly of claim 2, wherein the threaded post is angled 30 degrees relative to the threaded portion of the upper portion.

4. The dental assembly of claim 2, wherein the threaded post is angled 15 degrees or 20 degrees relative to the threaded portion of the upper portion.

5. The dental assembly of claim 1, wherein the angled platform is angled between 10-35 degrees relative to the line that is orthogonal to the length of the threaded post.

6. The dental assembly of claim 1, wherein the threaded post comprises a single lead thread or multiple lead threads.

7. The dental assembly of claim 1, wherein the threaded post comprises opposing axial cuts adapted for self-tapping into the bone or tissue.

8. The dental assembly of claim 1, wherein the implant has a maximum outside diameter between 1.5 mm and 4.0 mm.

9. A dental assembly convertible between a patient-removable state and a non-patient-removable state by interchanging retention members, the dental assembly comprising:

a dental appliance comprising a first recess and a second recess;

a first cap configured to be secured in the first recess;

a second cap configured to be secured in the second recess;

a first implant;

a first abutment member configured to attach to the first implant;

a second abutment member configured to attach to a second implant;

a first non-patient-removable retention member configured to engage within the first cap, the first non-patient-removable retention member having a first end and a continuous, unbroken skirt extending from the first end defining an inner surface engagement portion over an outer locating surface of the first abutment member to form a first non-patient removable attachment to the first abutment member based on a retentive force of 10 to 75 pounds to convert the dental assembly to a non-patient-removable state, the first non-patient-removable retention member comprises a rigid material configured to provide the retentive force of about 10 to 75 pounds when the first non-patient-removable attachment forms;

wherein the first abutment member is configured to engage with a patient-removable replacement retention member to form first patient-removable attachment to the patient-removable replacement retention member to convert the dental assembly to a patient-removable state based on a retentive force of less than 10 pounds, wherein the patient-removable replacement retention member comprises a resilient material more resilient than the rigid material to provide the retentive force of less than 10 pounds when the patient-removable attachment forms to convert the dental assembly to the patient-removable state, wherein the patient-removable replacement retention member comprises a second end and a second continuous, unbroken skirt extending from the second end defining a second inner surface for patient removable engagement over the outer locating surface of the first abutment member, in place of the non-patient-removable retention member;

a second non-patient-removable retention member configured to engage within the second cap, the second non-patient-removable retention member having a third end and a third continuous, unbroken skirt extending from the third end defining a third inner surface engagement portion configured to engage over an outer locating surface of the second abutment member to form a second non-patient removable attachment to the second abutment member based on a retentive force of 10 to 75 pounds to convert the dental assembly to a second non-patient-removable state, the second non-patient-removable retention member comprises a rigid material configured to provide the retentive force of between 10 to 75 pounds when the second non-patient-removable attachment forms;

wherein the first implant comprises an upper portion and a lower portion;

wherein the upper portion comprises a threaded portion configured to screw into a threaded recess of the first abutment member; and wherein the lower portion comprises an angled platform and a threaded post extending from the angled platform, the threaded post configured to engage with bone or tissue in the mouth of the patient based on a thread of the threaded post, wherein the angled platform is angled relative to a line that is orthogonal to a length of the threaded post from a center of the angled platform to a tip of the threaded post.

10. The dental assembly of claim 9, wherein the threaded post is angled relative to the threaded portion of the upper portion.

11. The dental assembly of claim 9, wherein the angled platform is angled between 10-35 degrees relative to the line that is orthogonal to the length of the threaded post.

12. The dental assembly of claim 9, wherein the threaded post comprises a single lead thread or multiple lead threads.

13. The dental assembly of claim 9, wherein the threaded post comprises opposing axial cuts adapted for self-tapping into the bone or tissue.

14. The dental assembly of claim 9, wherein the first implant has a maximum outside diameter between 1.5 mm and 4.0 mm.

\* \* \* \* \*